(12) United States Patent
Mohajerani

(10) Patent No.: US 9,391,538 B2
(45) Date of Patent: Jul. 12, 2016

(54) SWITCHED POWER CONVERTER

(75) Inventor: Zahra Mohajerani, Franklin Park, NJ (US)

(73) Assignee: Princeton Power Systems, Inc., Lawrenceville, NJ (US)

( * ) Notice: Subject to any disclaimer, the term of this patent is extended or adjusted under 35 U.S.C. 154(b) by 134 days.

(21) Appl. No.: 13/238,688

(22) Filed: Sep. 21, 2011

(65) Prior Publication Data
US 2013/0070499 A1 Mar. 21, 2013

(51) Int. Cl.
H02M 7/06 (2006.01)
H02M 7/48 (2007.01)
H02M 7/757 (2006.01)

(52) U.S. Cl.
CPC ............ H02M 7/4807 (2013.01); H02M 7/757 (2013.01)

(58) Field of Classification Search
CPC ............................ H02M 7/4807; H02M 7/757
USPC ........... 363/13, 44, 45, 47, 48, 74, 78, 95, 97, 363/98
See application file for complete search history.

(56) References Cited

U.S. PATENT DOCUMENTS

| | | | | |
|---|---|---|---|---|
| 4,523,269 A * | 6/1985 | Baker | ...................... | H02M 5/14 307/110 |
| 4,926,104 A | 5/1990 | King et al. | | |
| 4,959,766 A * | 9/1990 | Jain | ................................. | 363/48 |
| 5,119,285 A * | 6/1992 | Liu et al. | ........................ | 363/127 |
| 5,121,314 A * | 6/1992 | Cathell et al. | .................... | 363/17 |
| 5,224,029 A * | 6/1993 | Newman, Jr. | .................... | 363/48 |
| 5,267,138 A * | 11/1993 | Shores | ........................... | 363/98 |
| 5,329,221 A * | 7/1994 | Schauder | ....................... | 323/207 |
| 5,345,375 A * | 9/1994 | Mohan | .............................. | 363/40 |
| 6,118,678 A | 9/2000 | Limpaecher et al. | | |
| 6,462,492 B1 | 10/2002 | Sakamoto et al. | | |
| 6,765,452 B2 * | 7/2004 | Yuan et al. | .................... | 333/17.1 |
| 7,064,514 B2 | 6/2006 | Iwaji et al. | | |
| 7,333,331 B2 * | 2/2008 | Yamabuchi et al. | .......... | 361/699 |
| 7,643,317 B2 * | 1/2010 | Katoh et al. | .................... | 363/44 |
| 7,659,700 B2 | 2/2010 | Holveck et al. | | |
| 2006/0250765 A1 * | 11/2006 | Yamabuchi et al. | .......... | 361/683 |
| 2010/0128502 A1 | 5/2010 | Kawamoto et al. | | |

OTHER PUBLICATIONS

"Related U.S. Appl. No. 13/090,426 Office Action", Aug. 9, 2013, Publisher: USPTO, Published in: US.
"Related U.S. Appl. No. 13/090,426 Office Action", Oct. 22, 2013, Publisher: USPTO, Published in: US.

* cited by examiner

*Primary Examiner* — Jenny L Wagner
*Assistant Examiner* — Michael E Moats, Jr.
(74) *Attorney, Agent, or Firm* — Kaplan Breyer Schwarz & Ottesen, LLP

(57) ABSTRACT

A power converter includes a DC port and an AC port. A set of controllable "DC" switches couples the DC port to a central series-resonant circuit, and a set of "AC switches couples the central circuit through a filter to the AC port. A switch control circuit responds to secondary-to-tertiary and inversion time percentages, and a modulator is responsive to the AC filter voltage and to the current at the AC port, for generating the inversion (inv) and secondary-to-tertiary (s2t) time percentages.

9 Claims, 21 Drawing Sheets

SWITCHED POWER CONVERTER

BACKGROUND

Controllable direct-current-to-alternating-current (DC-to-AC) and alternating-current-to-direct-current (AC-to-DC) converters are widely used. Among examples of such converters are U.S. Pat. No. 7,659,700, issued Feb. 9, 2010 in the name of Holvek et al. and the type of converter circuit is described more generally in U.S. Pat. No. 6,138,678, issued Sep. 12, 2000 in the name of Limpaecher et al. A control system for such a power converter for use in conjunction with an induction motor is described in U.S. patent application Ser. No. 13/090,426, filed Apr. 20, 2011 in the name of Yang Liu.

Improved or alternative switched power converters and control arrangements are desired.

SUMMARY

A power converter according to an aspect of the disclosure comprises a DC port, an AC port, a central resonant circuit, and a set of controllable "DC" switches electrically communicating with the DC port and with the central resonant circuit. The power converter also comprises a filter electrically communicating with the AC port and a set of "AC" switches electrically communicating with the central resonant circuit and the filter. A switch control circuit electrically communicates with the DC and AC switches, and is responsive to phase order, to secondary-to-tertiary time percentage, and to inversion time percentages for controlling inversion and normal conduction times of the DC and AC switches. A modulator is responsive to the voltage of the DC port, to the voltage of the filter, to current command signals, and to the current at the AC port, for generating the phase order, inversion time percentage and secondary-to-tertiary time percentages. The central resonant circuit may be a series resonant circuit. In a particular embodiment of the converter, the modulator comprises a primary-secondary-tertiary selector electrically communicating with the filter for determining the phase order, and a norm calculator receiving the current command signals, for generating normalized norm (i.e. normalized peak value) of the current command signals. A subtractor electrically communicates with the norm calculator for subtracting the normalized norm of the current command signals from signals representing a maximum allowable value of the current command signals, to thereby generate the inversion time percentage. A secondary-to-primary current ratio calculator is coupled or configured to receive the current command signals, and is also configured for receiving the phase order, for generating ideal secondary-to-primary ratio. A secondary-to-primary current ratio calculator is configured to receive the phase order, and is also configured to receive a sample of the current at the AC port, for generating actual secondary-to-primary ratio. A proportional-integral processor is configured for receiving the ideal and actual secondary-to-primary ratios, for generating secondary-to-tertiary percentage adjustment signal, and a summing processor is configured to receive the actual secondary-to-primary ratio and is also configured to receive the secondary-to-tertiary percentage adjustment signal, for summing a secondary-to-primary adjustment signal with the ideal secondary-to-primary ratio to thereby produce the secondary-to-primary time percentage. In another embodiment of the converter, the switch control circuit responsive to phase order, to secondary-to-tertiary time percentage, and to inversion time percentage for controlling the inversion and normal conduction times of the DC and AC switches comprises (a) a receiver for receiving the secondary-to-tertiary transition time and the inversion time command, and for calculating the switching times therefrom, (b) a current direction determining arrangement for finding the central link current direction from the secondary-to-tertiary transition time and the inversion transition time, (c) a current polarity determining arrangement for determining the input and output current polarities, (d) an active switch finder for finding the active switches, and (e) a switch command generator for generating the ON and OFF switch control signals for the active switches.

A controller for a power converter according to another aspect of the disclosure includes a direct voltage port and a three-phase AC port, and also includes a low-pass filter. The low-pass filter includes a low-pass filter first port and a low-pass filter second port, with the low-pass filter second port electrically communicating with the three-phase port of the converter. The low-pass filter second port may be connected by way of current sensors. The low-pass filter also includes a set of filter sample voltage connections coupled for sampling low-pass filter voltages. The power converter includes a resonant central link which may be series-resonant. The power converter also includes first and second controllable switch sets. The first switch set connects the direct voltage port to the central link, and the second controllable switch set connects the central link to the low-pass filter first port in each of three possible operating modes. The power converter also includes alternating voltage and current sensors electrically communicating with the alternating port, for generating samples of the alternating voltage and current, respectively. The power converter also includes a direct voltage sensor electrically communicating with the direct voltage port for generating samples of the direct voltage. In a first of the three possible operating modes, power is transferred from the direct voltage port to the alternating port with controlled real and reactive power, and in this mode AC port is connected to the AC grid. In the second possible operating mode, power is transferred from the direct voltage port to the three-phase port with constant peak three-phase voltage. In this mode the AC port is connected to an AC load, and in the third possible operating mode, power is transferred from the three-phase port to the direct voltage port. The controller comprises a switch element controller for generating ON-OFF control signals for the first and second controllable switch sets in response to inversion and secondary-to-tertiary time percentages. A modulator is responsive to the DC port voltage, to the low-pass filter voltages and to the current at the AC port, for generating the inversion and secondary-to-tertiary time percentages. In an embodiment, the resonant circuit is series-resonant.

A power converter according to a yet further aspect of the disclosure comprises a DC port, an AC port, and a central resonant circuit. The central resonant circuit may be a series-resonant circuit. The power converter comprises a set of controllable "DC" switches electrically communicating with the DC port and the central resonant circuit, and a filter electrically communicating with the AC port, which filter generates a voltage during operation of the converter. The power converter also comprises a set of "AC" switches electrically communicating with the central resonant circuit and the filter. An internal command generator calculates the currents required at the AC port to satisfy at least the desired converter power and DC voltage, and generates internal current commands representing the currents at the AC port. A switch control circuit electrically communicates with the DC and AC switches, for selecting the active switches in response to sensor feedback and the internal current commands, and for calculating switch ON and OFF times using "inversion" and "secondary-to-tertiary" time commands. A modulator is responsive to the internal current commands, and calculates the required percentage of "inversion" and "secondary-to-tertiary" time percentages to satisfy the current commands from the internal command generator block.

A method according to an aspect of the disclosure is for controlling a power converter, which power converter includes a direct voltage port and a three-phase AC port, and which also includes a low-pass filter. The low-pass filter includes a low-pass filter first port and a low-pass filter second port. The low-pass filter second port is in electrical communication with the three-phase port of the power converter. The power converter includes a resonant central link, and first and second controllable switch sets. The first switch set connects the direct voltage port to the central link, and the second controllable switch set connects the central link to the low-pass filter first port. The power converter also includes alternating voltage and current sensors electrically communicating with the alternating port, for generating samples of the alternating voltage and current, respectively. The first operating mode provides power transfer from the direct voltage port to the alternating port with controlled real and reactive power, the second operating mode provides power transfer from the direct voltage port to the three-phase port with constant peak three-phase voltage, and the third operating mode provides power transfer from the three-phase port to the direct voltage port. The method comprises the steps of (a) generating ON-OFF control signals for the first and second controllable switch sets in response to inversion and secondary-to-tertiary time percentages, and (b) generating the inversion and secondary-to-tertiary time percentages in response to the filter voltage and to the current at the AC port.

DETAILED DESCRIPTION

Figures 1A, 1B:
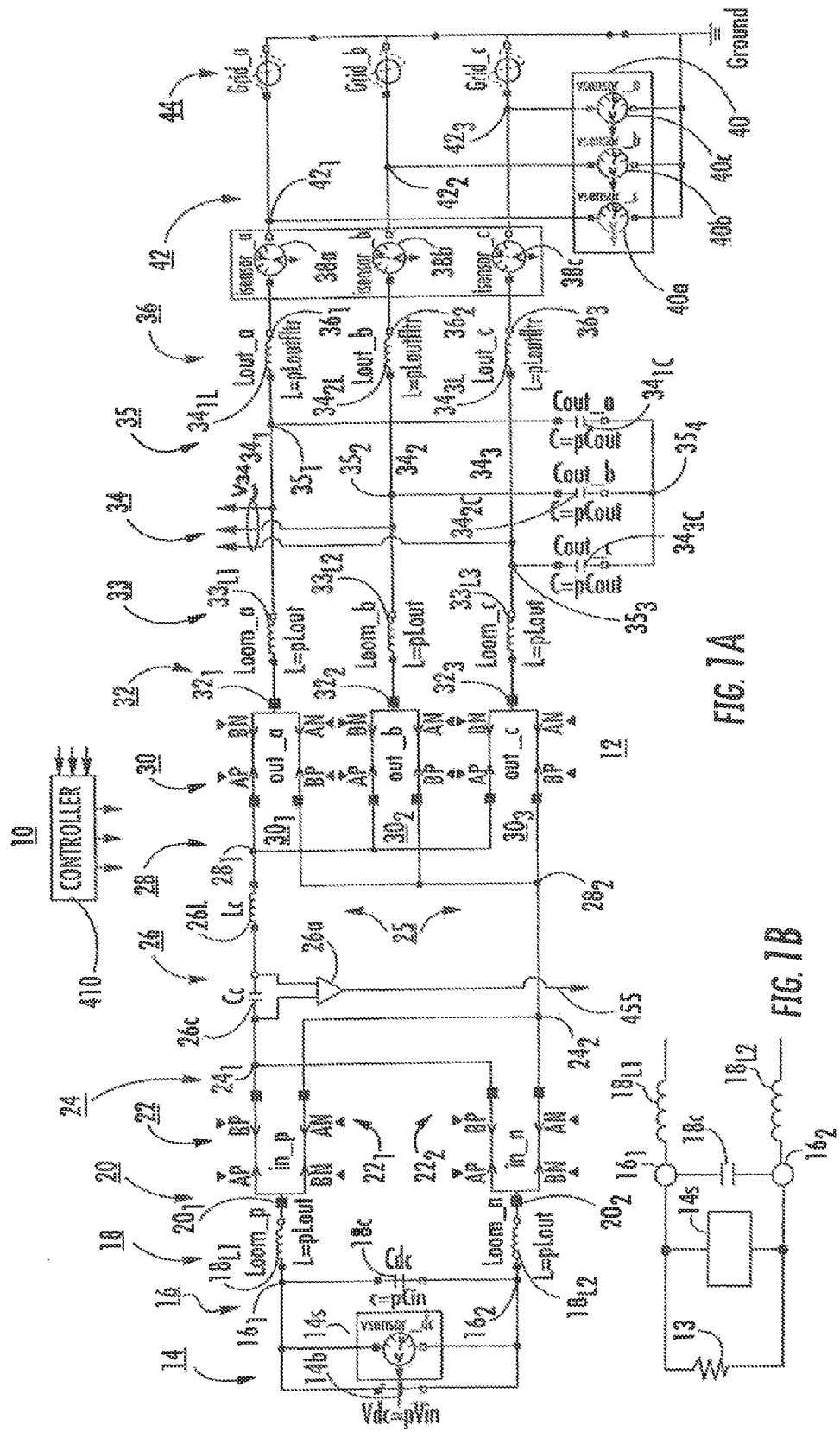
FIG. 1A is a simplified diagram in block and schematic form illustrating a hardware switching circuit for a power converter according to an aspect of the disclosure, for coupling power by way of a central link between a direct voltage port and a three-phase alternating port coupled to a power grid (to the power mains)
FIG. 1B is a simplified schematic diagram of an alternative arrangement for the direct voltage port portion of the arrangement of FIG. 1A.

FIG. 1A is a simplified diagram in block and schematic form illustrating a power converter 10 according to an aspect of the disclosure, including a hardware switching "Transverse Alternating Current" (TAC) circuit 12 and a controller 410. The hardware switching circuit 12 couples power by way of an Alternating Current (AC) central link 26 extending between a direct voltage port 16 and a three-phase alternating port 42 coupled to a power grid 44. A direct voltage source 14 at the left of FIG. 1A is illustrated as including a battery 14$b$ and a voltage sensor 14$s$. Direct voltage source 14 is coupled to port 16 at terminals, nodes or connections 16$_1$ and 16$_2$. Port 16 is also connected to a switching noise reduction low-pass filter 18. Low-pass filter 18 includes a capacitor 18$c$ coupled across source terminals 16$_1$ and 16$_2$ of port 16. Filter 18 also includes "commutation" inductors 18$_{L1}$ and 18$_{L2}$, each with one end connected to a terminal 16$_1$, 16$_2$, respectively. The other ends of inductors 18$_{L1}$ and 18$_{L2}$ are connected at terminals 20$_1$ and 20$_2$ to subsets 22$_1$ and 22$_2$, respectively, of set or superset 22 of controllable switches. Details of controllable switch set 22 and controllable switch set or superset 30, described further on, are illustrated in FIGS. 3B and 3C, respectively. Subset 22$_1$ of controllable switch set 22 is connected between terminal 20$_1$ and terminals 24$_1$ and 24$_2$ of terminals set 24, and subset 22$_2$ of controllable switch set 22 is connected between terminal 20$_2$ and terminals 24$_1$ and 24$_2$. Terminals 24$_1$ and 24$_2$ of terminals set 24 define first ends of a two-conductor path 25, and terminals 28$_1$ and 28$_2$ of terminals set 28 defines the other end of two-conductor path 25. A series-resonant AC link or "tank" 26 is coupled to two-conductor path 25. The term "tank" is most often used to describe parallel-resonant LC circuits, but is equally applicable to series-resonant circuits with low series resistance. The series-resonant link 26 includes a capacitor 26c and an inductor 26L. As known to those skilled in the art, series-resonant link 26 can be coupled or connected as illustrated between terminals $24_1$ and $28_1$, or can be coupled between terminals $24_2$ and $28_2$, or can be allocated with capacitor 26c connected between terminals $24_1$ and $28_1$ and with inductor 26L connected between terminals $24_2$ and $28_2$. Low-pass filter 18 as a whole, or the inductors 18L1 and 18L2, may be viewed as being a part of the controllable switch set 22 (also referred to as TAC DC bridge). A differential amplifier 26a has its input ports coupled across capacitor 26c of tank 26, and produces a sample of the tank voltage on path 455.

It should be noted that the terms "between," "across," and other terms such as "parallel" have meanings in an electrical context which differ from their meanings in the field of mechanics or in ordinary parlance. More particularly, the term "between" in the context of signal or electrical flow relating to two separate devices, apparatuses or entities does not relate to physical location, but instead refers to the identities of the source and destination of the flow. Thus, flow of signal "between" A and B refers to source and destination, and the flow itself may be by way of a path which is nowhere physically located between the locations of A and B. The term "between" can also define the end points of the electrical field extending "across" or to points of differing voltage or potential, and the electrical conductors making the connection need not necessarily lie physically between the terminals of the source. Similarly, the term "parallel" in an electrical context can mean, for digital signals, the simultaneous generation on separate signal or conductive paths of plural individual signals, which taken together constitute the entire signal. For the case of current, the term "parallel" means that the flow of a current is divided to flow in a plurality of separated conductors, all of which are physically connected together at disparate, spatially separated locations, so that the current travels from one such location to the other by plural paths, which need not be physically parallel.

In addition, discussions of circuits necessarily describe one element at a time, as language is understood in serial time. Consequently, a description of two interconnected elements may describe them as being in "series" or in "parallel," which may be true for the two elements described. However, further description of the circuit may implicate other interconnected devices, which when connected to the first two devices may result in current flows which contradict the "series" or "parallel" description of the original-two devices. This is an unfortunate result of the limitations of language, and all descriptions herein should be understood in that context.

Also, the term "coupled" as used herein includes electrical activity extending from one element to another element either by way of an intermediary electrical element or in the absence of any intermediary electrical element.

Returning now to FIG. 1A, a set or superset 30 of controllable switch sets includes controllable switch subsets $30_1$, $30_2$, and $30_3$. Superset 30 is also referred to as TAC AC bridge. Switch subset $30_1$ of superset 30 connects terminals, nodes or connections $28_1$ and $28_2$ to a terminal, node or connection $32_1$ of a set 32 of terminals, nodes or connections. Similarly, switch subset $30_2$ connects terminals $28_1$ and $28_2$ to a terminal $32_2$, and switch subset $30_3$ connects terminals $28_1$ and $28_2$ to a terminal $32_3$. Terminals $32_1$, $32_2$, and $32_3$ connect to a set 33 of three series "commutation" inductors 33L1, 33L2, and 33L3, respectively, which tend to damp fast current transitions attributable to the commutation of the switches of superset 30 during secondary-to-tertiary switching transition. The ends of commutation inductors 33L1, 33L2, and 33L3 remote from terminals $32_1$, $32_2$, and $32_3$ connect at a set 35 of contacts, terminals or nodes $35_1$, $35_2$, and $35_3$, respectively, to low-pass ell (L) filters $34_1$, $34_2$, and $34_3$, designated together as three-phase low-pass ell filter 34, which in turn couple to terminals $36_1$, $36_2$, and $36_3$ of terminal set 36. Low-pass filter $34_1$ includes a "shunt" capacitor $34_{1C}$ connected to conductor or terminal $35_1$ and to a neutral conductor $35_4$ together with a "series" inductor $34_1L$ connected from terminal $35_1$ to terminal $36_1$. Similarly, low-pass filter $34_2$ includes a shunt capacitor $34_{2C}$ connected to terminal $35_2$ and to neutral conductor $35_4$ together with a series inductor $34_2L$ connected from terminal $35_2$ to terminal $36_2$. Low-pass filter $34_3$ includes a shunt capacitor $34_{3C}$ connected to terminal $35_3$ and to neutral conductor $35_4$ together with a series inductor $34_3L$ connected from terminal $35_3$ to terminal $36_3$. Thus, three-phase low-pass ell filter 34 connects between the three-phase conductors or terminals of set 35 and the three-phase terminals of set 36. A voltage is generated by three-phase low-pass ell filter 34 during operation of the switched power converter, and a sample of the voltage is made available by a bus or path v34.

Referring once more to FIG. 1A, three-phase "filter output" terminals $36_1$, $36_2$, and $36_3$ of set 36 of filter terminals are coupled by way of current sensors 38a, 38b, and 38c to three-phase power phases Grid_a, Grid_b, and Grid_c, at terminals $42_1$, $42_2$, and $42_3$, respectively, of AC port 42. The three-phase AC or grid terminals are designated together as 42. A set 40 of voltage sensors is coupled to the Grid_a, Grid_b, and Grid_c phases of the grid. The grid itself is designated 44. As known, the power grid may be viewed as being a "voltage" or low-impedance source, the voltage of which cannot be changed by applying voltage from an external source. That is to say, the grid 44 may be viewed as having zero internal impedance.

The arrangement of FIG. 1A can be operated or controlled in a bidirectional manner, depending upon how the switches are controlled. That is to say, that power may flow from the direct voltage source 14 to the alternating grid 44 at port 42 (that is, from left to right in FIG. 1A), or may flow from the alternating grid 44 at port 42 to the direct voltage source 14 (from right to left in FIG. 1A). The direct-voltage source battery 14b conceptually discharges when power flows therefrom to the grid 44, and the battery 14b charges when power flows from the grid 44 to the battery. As mentioned, the voltage of the grid cannot be varied, so flow of power to and from the grid at three-phase port 42 is accomplished by application of current. To the extent that the battery or direct voltage source 14 is ideal, it has no internal impedance, so the same current mode operation is required for transfer of power to the direct voltage source 14 at port 16.

While FIG. 1A shows a battery 14 connected to DC port 16, those skilled in the art know that it is also possible to connect a direct-voltage load such as a resistor to the DC terminals instead of a battery for operation in the AC-to-DC mode of operation. FIG. 1B illustrates a resistive load 13 connected to direct-voltage terminals $16_1$ and $16_2$ of port 16 instead of a battery.

Figure 2:
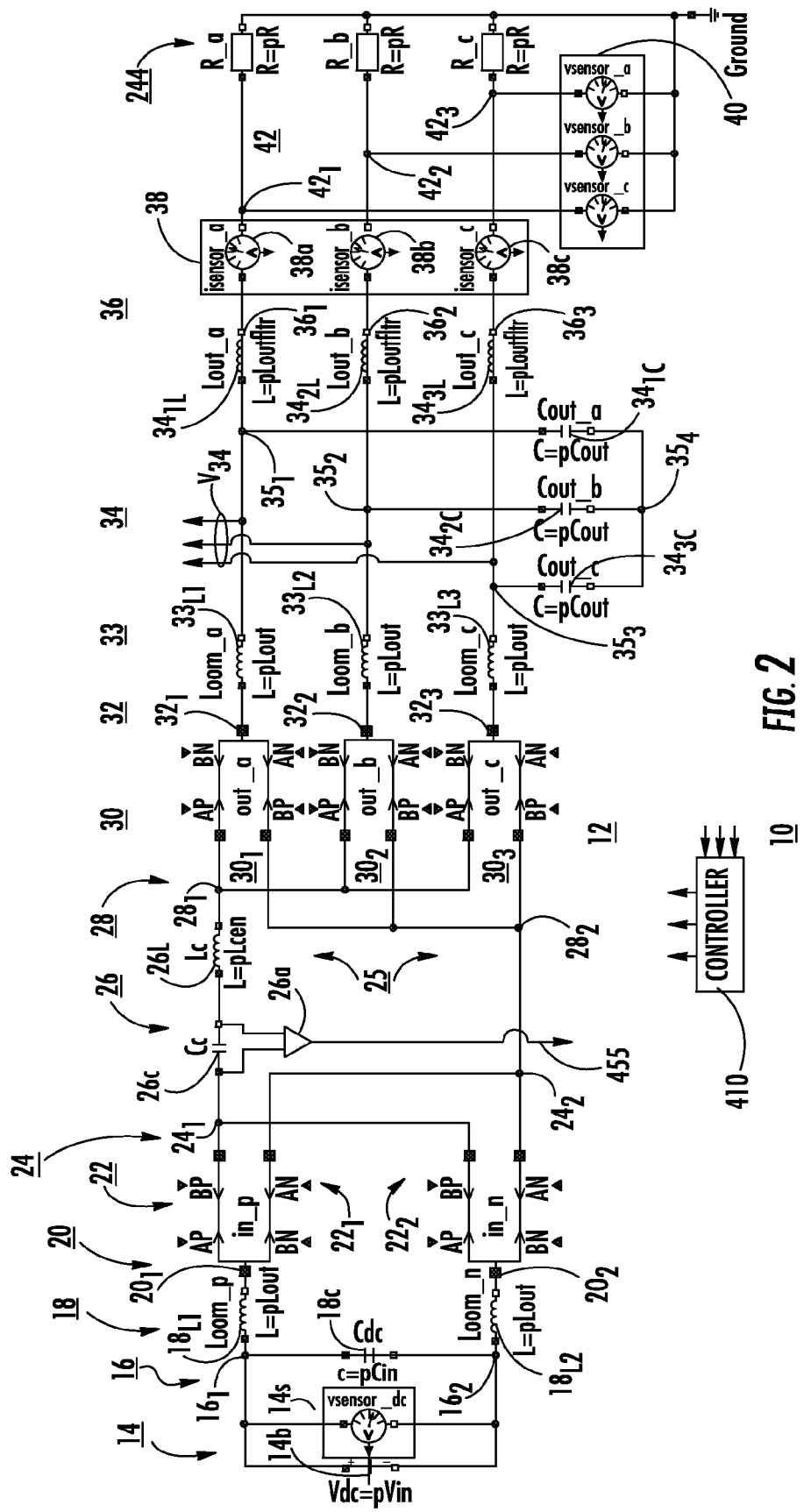
FIG. 2 is a simplified diagram in block and schematic form illustrating a hardware switching circuit according to an aspect of the disclosure, for coupling power by way of a central link between a direct voltage port and a three-phase alternating load port.

FIG. 2 is a simplified diagram in block and schematic form, illustrating another aspect of the disclosure. In FIG. 2, elements corresponding to those of FIG. 1A are designated by like reference alphanumerics. The salient difference between the arrangements of FIG. 1A and FIG. 2 is that the alternating power port 42 of FIG. 1A is connected to a voltage source (grid 44) while the alternating power or alternating current port 42 of FIG. 2 is connected to a three-phase resistive load designated generally as 244. The significance of this difference is that the voltage across the three-phase port 42 can be controlled in the arrangement of FIG. 2, while it cannot be controlled in the arrangement of FIG. 1A. While a resistive load is illustrated, those skilled in the art recognize that an inductive or capacitive load may also be used.

Figure 3A:
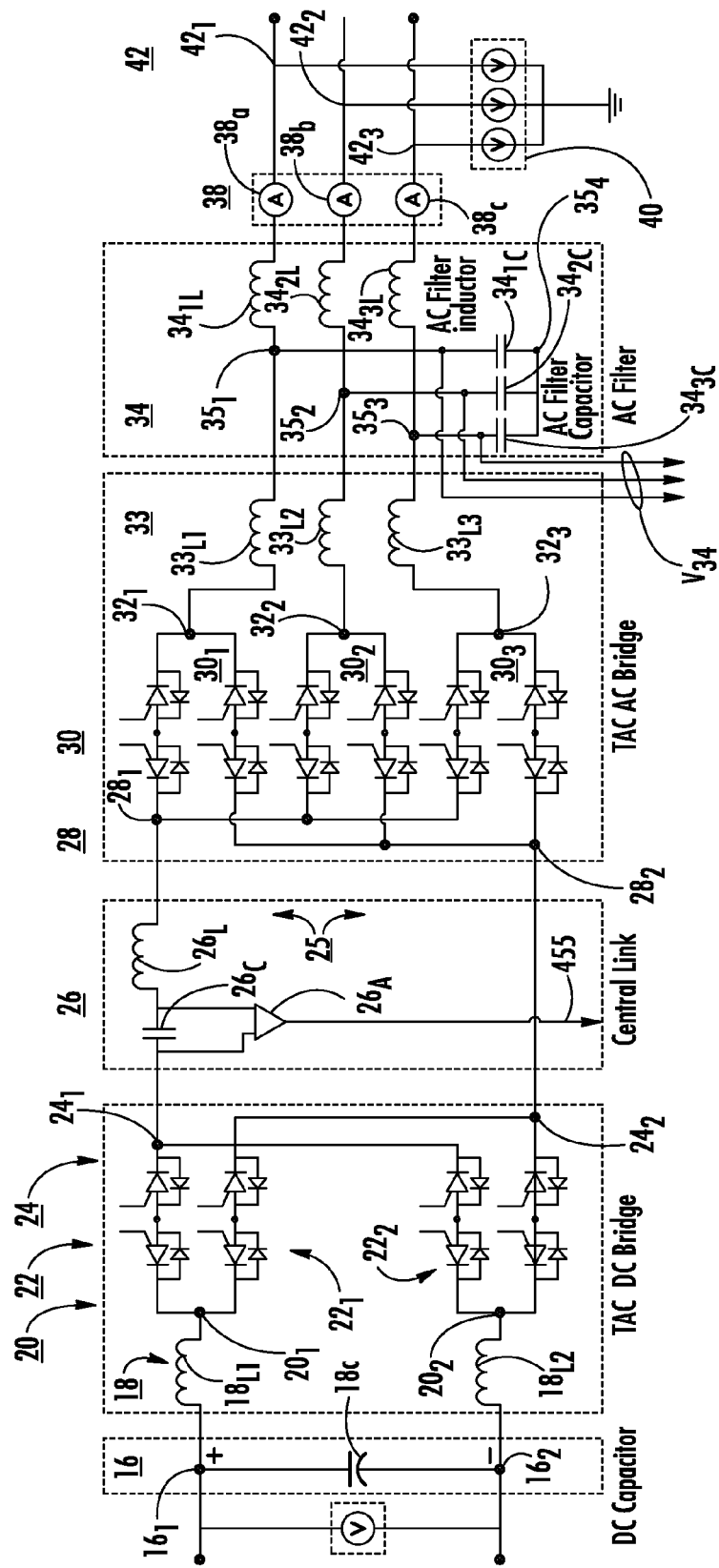
FIG. 3A illustrates details of the arrangements of FIGS. 1A, 1B, and 2 for the cases of DC-to-AC-voltage-source, DC-to-AC-current-source, and AC-to-DC power conversion.
Figure 3B:
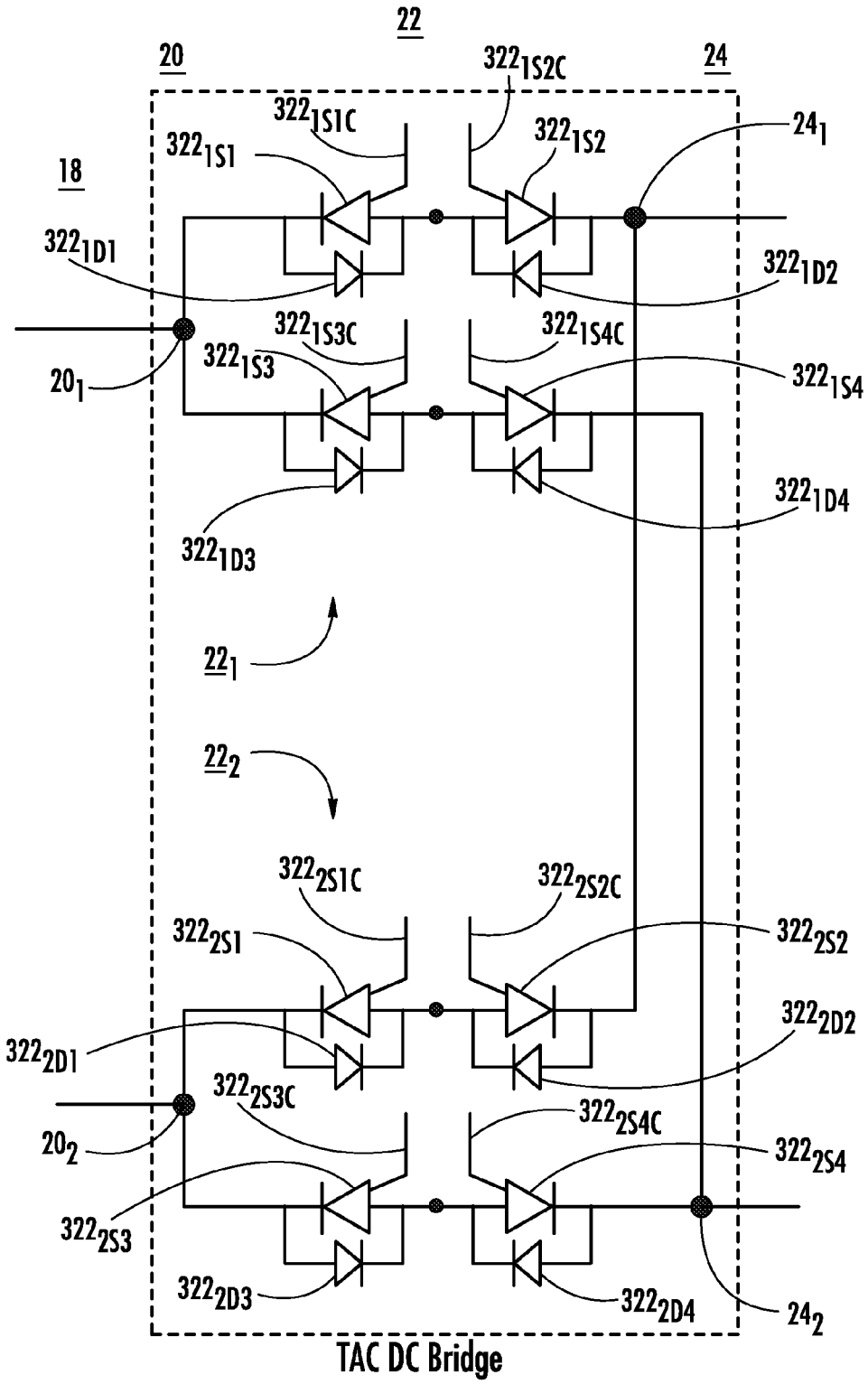
FIG. 3B illustrates details of a Transverse Alternating Current (TAC) DC bridge of FIG. 3A.
Figure 3C:
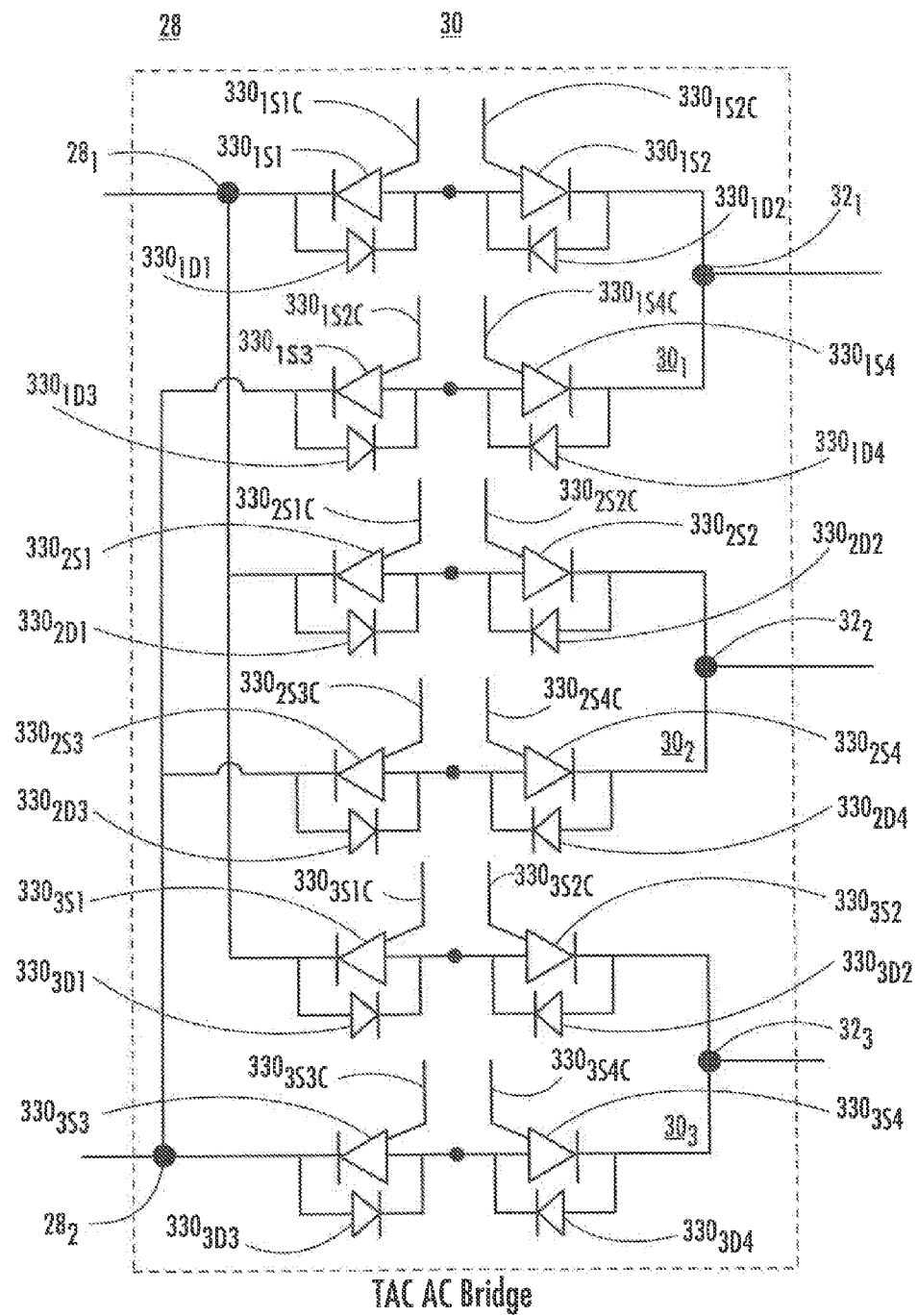
FIG. 3C illustrates details of a Transverse Alternating Current (TAC) AC bridge of FIG. 3A.

FIG. 3A is a simplified representation showing some details of the switching circuit sets or supersets 22 and 30 of FIGS. 1A and 2. In FIG. 3A, elements corresponding to those of FIG. 1A or 2 are designated by like reference alphanumerics. Details of Transverse Alternating Current (TAC) DC bridge or switch superset 22 and of TAC AC bridge or switch superset 30 of FIG. 3A appear in FIGS. 3B and 3C, respectively. In FIG. 3B, switch superset 22 includes switch subsets $22_1$ and $22_2$, each of which includes a plurality of Gate-Turn-Off (GTO) thyristors (GTOs) and antiparallel diodes or rectifiers. The antiparallel diodes conduct current in the reverse direction to that of the GTOs. In FIG. 3B, DC bridge switch subset $22_1$ includes four GTO switches, and DC bridge switch subset $22_2$ includes four GTO switches. A first GTO switch $322_{1S1}$ is controlled by signals applied to a gate lead $322_{1S1c}$, and is antiparalleled by a diode or rectifier $322_{1D1}$. A second GTO switch $322_{1D2}$ is controlled by signals applied to a gate lead $322_{1S2c}$ and is antiparalleled by a diode or rectifier $322_{1D2}$. The cathode of GTO switch $322_{1S1}$ is connected to terminal $20_1$ and the anode is connected to the anode of GTO switch $322_{1S2}$. The cathode of GTO switch $322_{1S2}$ is connected to terminal $24_1$. A third GTO switch $322_{1S3}$ is controlled by signals applied to a gate lead $322_{1S3c}$, and is antiparalleled by a diode or rectifier $322_{1D3}$. A fourth GTO switch $322_{1S4}$ is controlled by signals applied to a gate lead $322_{1S4c}$ and is antiparalleled by a diode or rectifier $322_{1D4}$. The cathode of GTO switch $322_{1S3}$ is connected to terminal $20_1$ and the anode is connected to the anode of GTO switch $322_{1S4}$. The cathode of GTO switch $322_{1S4}$ is connected to terminal $24_2$. In switch subset $22_2$ of FIG. 3B, a first GTO switch $322_{2S1}$ is controlled by signals applied to a gate lead $322_{2S1c}$, and is antiparalleled by a diode or rectifier $322_{2D1}$. A second GTO switch $322_{2S2}$ is controlled by signals applied to a gate lead $322_{2S2c}$ and is antiparalleled by a diode or rectifier $322_{2D2}$. The cathode of GTO switch $322_{2S1}$ is connected to terminal $20_2$ and the anode is connected to the anode of GTO switch $322_{2S2}$. The cathode of GTO switch $322_{2S2}$ is connected to terminal $24_1$. A third GTO switch $322_{2S3}$ is controlled by signals applied to a gate lead $322_{2S3c}$, and is antiparalleled by a diode or rectifier $322_{2D3}$. A fourth GTO switch $322_{2S4}$ is controlled by signals applied to a gate lead $322_{2S4c}$ and is antiparalleled by a diode or rectifier $322_{2D4}$. The cathode of GTO switch $322_{2S3}$ is connected to terminal $20_2$ and the anode is connected to the anode of GTO switch $322_{2S4}$. The cathode of GTO switch $322_{2S3}$ is connected to terminal $24_2$. The configuration of GTO switches of FIG. 3B allows control of the current flowing between the central tank or resonant circuit 26 and the single-phase terminals of set 20.

In FIG. 3C, AC Bridge switch superset 30 includes switch subsets $30_1$, $30_2$, and $30_3$, each of which includes a plurality of Gate-Turn-Off (GTO) thyristors (GTOs) and antiparallel diodes or rectifiers. Switch superset 30 includes switch subsets $30_1$, $30_2$, and $30_3$, each of which subsets includes a plurality of Gate-Turn-Off (GTO) thyristors (GTOs) and antiparallel diodes or rectifiers. The operation of such GTO switches is well known. In FIG. 3C, AC bridge switch subset $30_1$ includes four GTO switches, AC bridge switch subset $30_2$ includes four GTO switches, and AC bridge switch subset $30_3$ includes four GTO switches. In AC bridge switch subset $30_1$, a first GTO switch $330_{1S1}$ is controlled by signals applied to a gate lead $330_{1S1c}$, and is antiparalleled by a diode or rectifier $330_{1D1}$. A second GTO switch $330_{1S2}$ is controlled by signals applied to a gate lead $330_{1S2c}$ and is antiparalleled by a diode or rectifier $330_{1D2}$. The cathode of GTO switch $330_{1S1}$ is connected to terminal $28_1$ and the anode is connected to the anode of GTO switch $330_{1S2}$. The cathode of GTO switch $330_{1S2}$ is connected to terminal $32_1$. A third GTO switch $330_{1S3}$ is controlled by signals applied to a gate lead $330_{1S3c}$, and is antiparalleled by a diode or rectifier $330_{1D3}$. A fourth GTO switch $330_{1S4}$ is controlled by signals applied to a gate lead $330_{1S4c}$ and is antiparalleled by a diode or rectifier $330_{1D4}$. The cathode of GTO switch $330_{1S3}$ is connected to terminal $28_2$ and the anode is connected to the anode of GTO switch $330_{1S4}$. The cathode of GTO switch $330_{1S4}$ is connected to terminal $32_1$. In switch subset $30_2$ of FIG. 3B, a first GTO switch $330_{2S1}$ is controlled by signals applied to a gate lead $330_{2S1c}$, and is antiparalleled by a diode or rectifier $330_{2D1}$. A second GTO switch $330_{2S2}$ is controlled by signals applied to a gate lead $330_{2S2c}$ and is antiparalleled by a diode or rectifier $330_{2D2}$. The cathode of GTO switch $330_{2S1}$ is connected to terminal $28_1$ and the anode is connected to the anode of GTO switch $330_{2S2}$. The cathode of GTO switch $330_{2S2}$ is connected to terminal $32_2$. A third GTO switch $330_{2S3}$ is controlled by signals applied to a gate lead $330_{2S3c}$, and is antiparalleled by a diode or rectifier $330_{2D3}$. A fourth GTO switch $330_{2S4}$ is controlled by signals applied to a gate lead $330_{2S4c}$ and is antiparalleled by a diode or rectifier $330_{2D4}$. The cathode of GTO switch $330_{2S3}$ is connected to terminal $28_2$ and the anode is connected to the anode of GTO switch $330_{2S4}$. The cathode of GTO switch $330_{2S4}$ is connected to terminal $32_2$. In switch subset $30_3$ of FIG. 3B, a first GTO switch $330_{3S1}$ is controlled by signals applied to a gate lead $330_{3S1c}$, and is antiparalleled by a diode or rectifier $330_{3D1}$. A second GTO switch $330_{3S2}$ is controlled by signals applied to a gate lead $330_{3S2c}$ and is antiparalleled by a diode or rectifier $330_{3D2}$. The cathode of GTO switch $330_{3S1}$ is connected to terminal $28_1$ and the anode is connected to the anode of GTO switch $330_{3S2}$. The cathode of GTO switch $330_{3S2}$ is connected to terminal $32_3$. A third GTO switch $330_{3S3}$ is controlled by signals applied to a gate lead $330_{3S3c}$, and is antiparalleled by a diode or rectifier $330_{3D3}$. A fourth GTO switch $330_{3S4}$ is controlled by signals applied to a gate lead $330_{2S4}$, and is antiparalleled by a diode or rectifier $330_{3D4}$. The cathode of GTO switch $330_{3S3}$ is connected to terminal $28_2$ and the anode is connected to the anode of GTO switch $330_{3S4}$. The cathode of GTO switch $330_{3S4}$ is connected to terminal $32_3$. The configuration of GTO switches of FIG. 3C allows control of the current flowing between the central tank or resonant circuit 26 and the three-phase terminals of set 32.

Figure 3D:
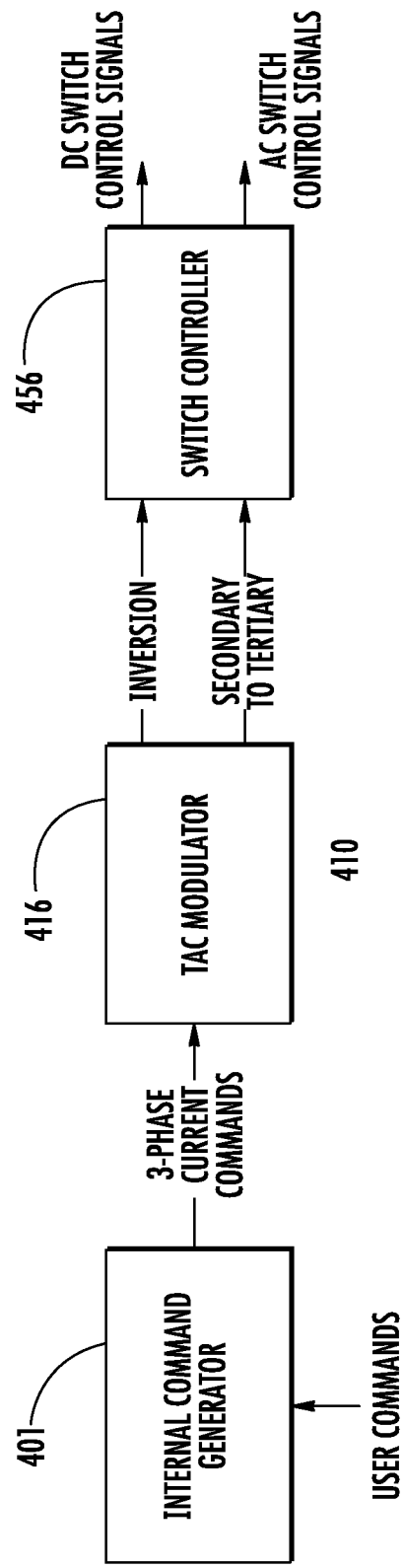
FIG. 3D is a simplified diagram illustrating a controller for the arrangements of FIGS. 1A, 1B, and 2.

FIG. 3D is a simplified representation of the controller 410 (FIGS. 1A and 2) for controlling the transverse AC (TAC) DC bridge 20 of FIG. 3B and the TAC AC bridge 30 of FIG. 3C. In FIG. 3D, user commands (e.g. requested power, desired DC voltage and etc.) are applied to an Internal Command generator 401. Internal command generator 401 produces 3-phase current command signals, which determines what the currents should "look like" at the terminals of AC port 42 to satisfy the user commands. The 3-phase current command signals are applied to a TAC modulator 416. TAC modulator 416 calculates or produces inversion and secondary-to-tertiary ratio or duty cycle (time percentage) signals which are required to satisfy the current commands. The inversion and secondary-to-tertiary ratio or duty cycle (time percentage) signals are applied to a switch controller or switch control-signals generator 456. The switch control-signals generator 456 selects the active switches using the sensor readings, feedbacks, and current commands. Switch ON and OFF times are calculated to produce DC and AC bridge switch control signals. As mentioned, the power converter 10 can be operated in any one of three separate modes. The operations of the TAC modulator 416 and of the switch control-signals generator 456 are not mode-dependent, and have the same sequence for all the three modes of operation. Internal command generator 401, on the other hand, has a mode specific operation sequence.

Figure 4A:
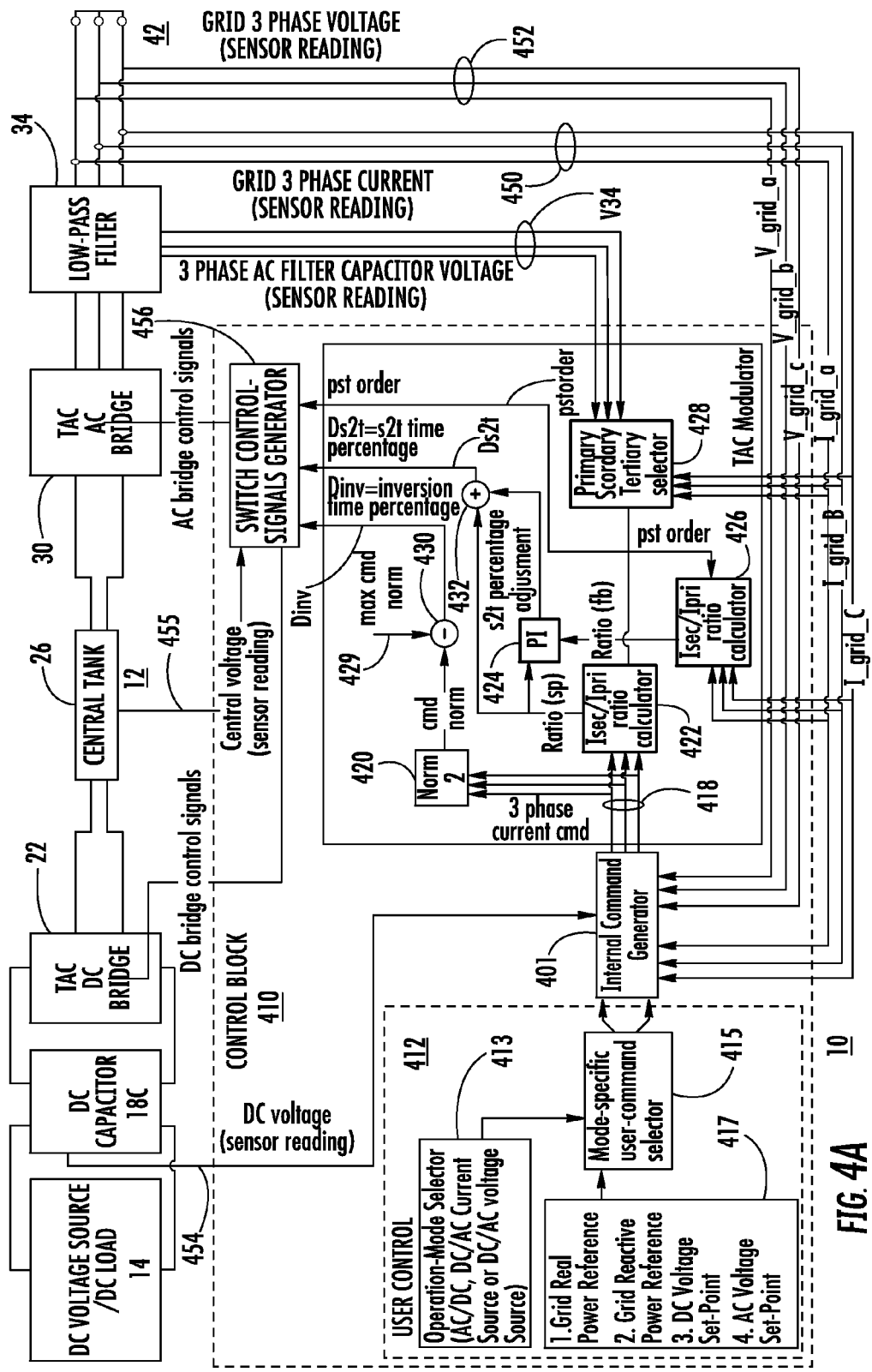
FIG. 4A is a simplified diagram in block and schematic form of a power converter according to an aspect of the disclosure, where the power converter includes hardware portions corresponding to those of FIGS. 1A, 1B, and 2, and a controller corresponding to FIG. 3D.

FIG. 4A is a simplified diagram in block and schematic form illustrating the arrangements of FIG. 1A, 1B, or 2 together with some details of the controller 410 of FIG. 3D. Elements of FIG. 4A corresponding to those of FIGS. 1A, 1B, 2, and 3D are designated by like alphanumerics. In FIG. 4A, the controller 410 (control block in FIG. 4A) controls power conversion in any one of (a) DC-to-AC-voltage-source operating mode (AC port 42 has a resistive load), (b) DC-to-AC-current-source operating mode (AC port is connected to power grid at the AC port 42), and (c) AC-to-DC operating mode (grid provides power to the DC port and regulates the DC port voltage). As mentioned, the DC-to-AC-voltage-source operating mode assumes that the AC terminals or port 42 are/is connected to a load, so that the voltage across the AC port can be varied to effectuate a power transfer. The DC-to-AC-current-source operating mode assumes that the power grid is connected to the AC terminals or port, and the voltage of the grid cannot be varied, so power application to the AC terminals is by way of application of current and not of voltage. The AC-to-DC operating mode assumes that power flows from the AC port or terminals to the DC terminals or port, which may be coupled to either a source as in FIG. 1A or a resistor as in FIG. 1B. In general, the arrangement of FIG. 4A includes the controller 410 and user controller 412.

Figure 7:
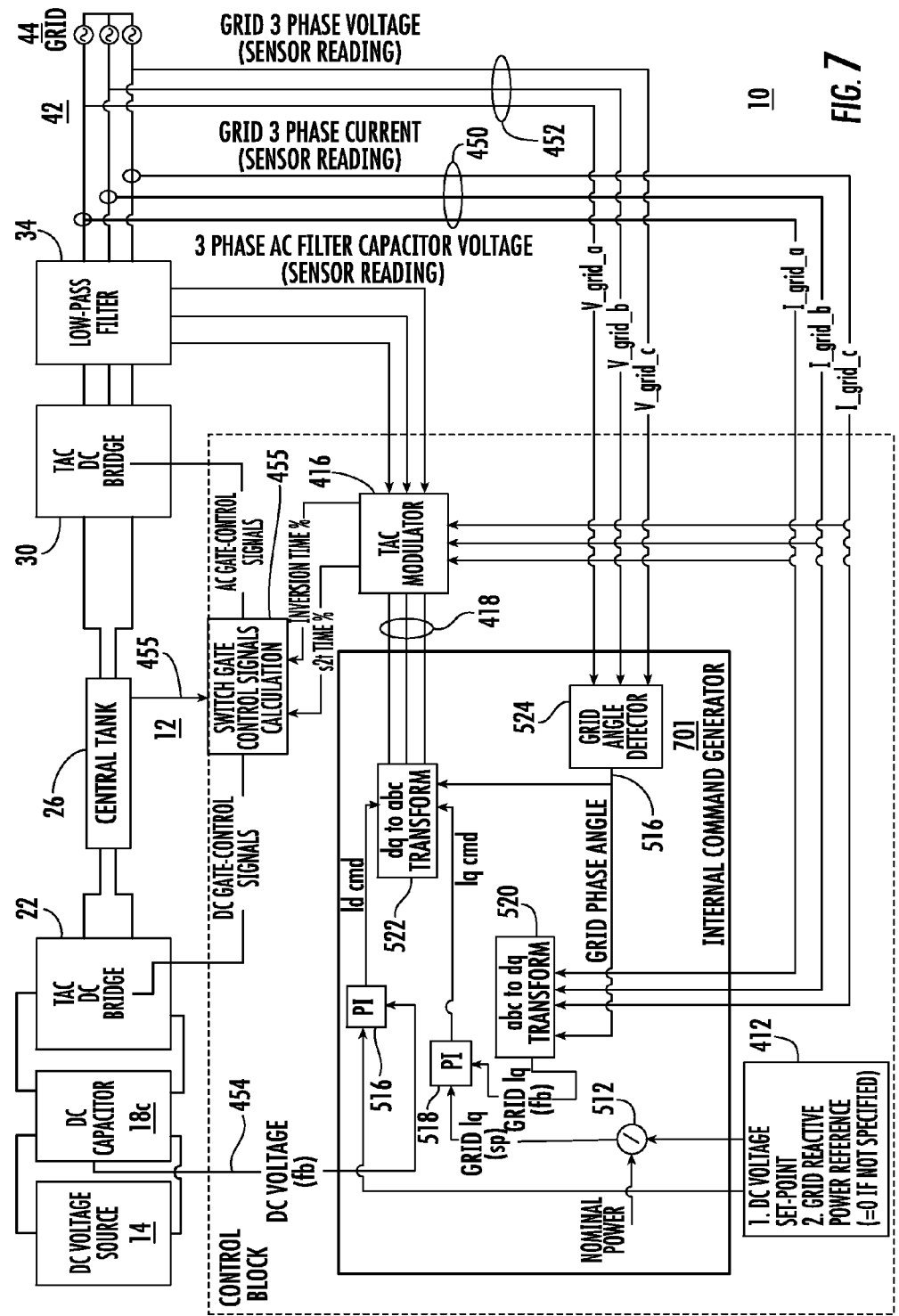
FIG. 7 is a diagram in block and schematic form, similar to FIG. 4A, showing details of the internal command generator for the power converter for use in a AC-to-DC situation.
Figure 8A:
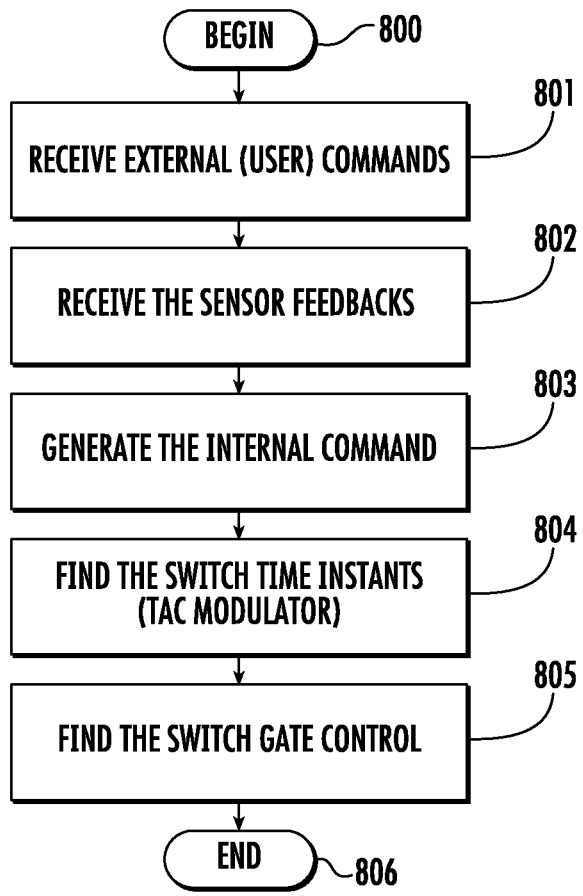
FIG. 8A is a simplified logic or control flow chart or diagram illustrating overall operation of the arrangement of FIG. 4A, and FIG. 8B includes logic or control flow charts or diagrams illustrating operation of the Mode-Specific User-Command generator of arrangement of FIG. 4A.

FIG. 8A is a simplified logic or control flow chart or diagram illustrating major steps in the overall operation of the controller 410 of FIG. 4A in controlling the power converter 10 of FIG. 1A, 1B or 2 in all operating modes. In FIG. 8A, the logic starts at a BEGIN block 800, and flows to a block 801. Logic block 801 represents the receipt by the controller 410 of the user commands from an external source, or alternatively the reception of user commands at block 412. From block 801 of FIG. 8A, the logic flows to a block 802. Block 802 represents the receipt of the various feedback signals, such as the DC voltage on capacitor 18c, the voltage of central tank 26, the voltage of filter 34, the voltage and current at AC port 42. Block 803 represents the generation by the internal command generator 401 of FIG. 4A, (or the internal command generators 501 (FIG. 5) 601 (FIG. 6 or \701 (FIG. 7), of the internal commands appropriate to the mode of operation, or in other words block 803 represents the generation of the internal command, namely the desired AC currents at port 42. Block 804 of FIG. 8A represents the determination or calculation of the switch time instants in the TAC Modulator 416, including selection of the active switches. Block 805 represents the finding of the active switches or finding the switch gate control. The logic terminates at an END block 806.

Referring again to FIG. 4A, user controller 412 includes an operating mode selector 413, which receives the desired operation mode from the user. The selected mode of operation is made available to a Mode-specific user-command selector 415, which chooses the appropriate set of operation commands according to the logic or command flowchart in FIG. 8B from the possible set 417 of operation commands 417.

For operation of the power converter 10 of FIG. 4A in one of the (a) DC-to-AC-voltage-source (load connected to AC port 42) operating mode, (b) DC-to-AC-current-source operating mode (grid connected to the AC port 42), and (c) AC-to-DC operating mode, a user command is applied to user controller 412 commanding the loading of the parameters applicable to the desired operating mode. More particularly, for the DC-to-AC-voltage-source (load connected to AC port 42) operating mode, only the AC peak voltage setpoints are required. For the DC-to-AC-current-source operating mode (grid connected to the AC port 42), the grid real and reactive power references are required. For the AC-to-DC operating mode, the direct voltage setpoint is required, and the grid reactive power is also required, but may be defaulted to zero (unity power factor). These values are preprogrammed based on the capabilities of the circuit or hardware 12. The values of the selected parameters are made available from selector 415 to the internal command generator 401. The internal command generator 401 receives samples of the direct voltage at the direct voltage port 14 by way of a sample path 454, and also receives, by way of sample buses or paths 450 and 452, samples of the grid AC current and grid AC voltage at port 42. The internal command generator 401 of FIG. 4A generates on a bus 418, in all three modes of operation, 3-phase current command signals representative of the current which is to flow in AC port 42.

Figure 8B:
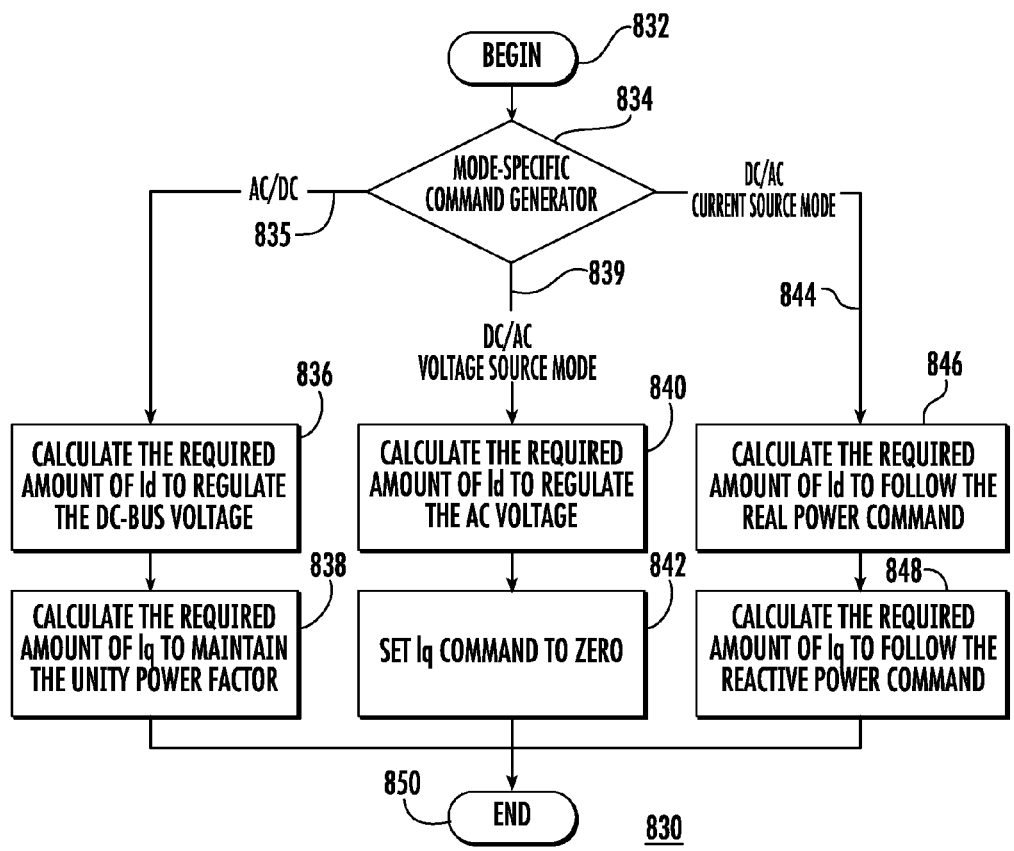
Figure 9:
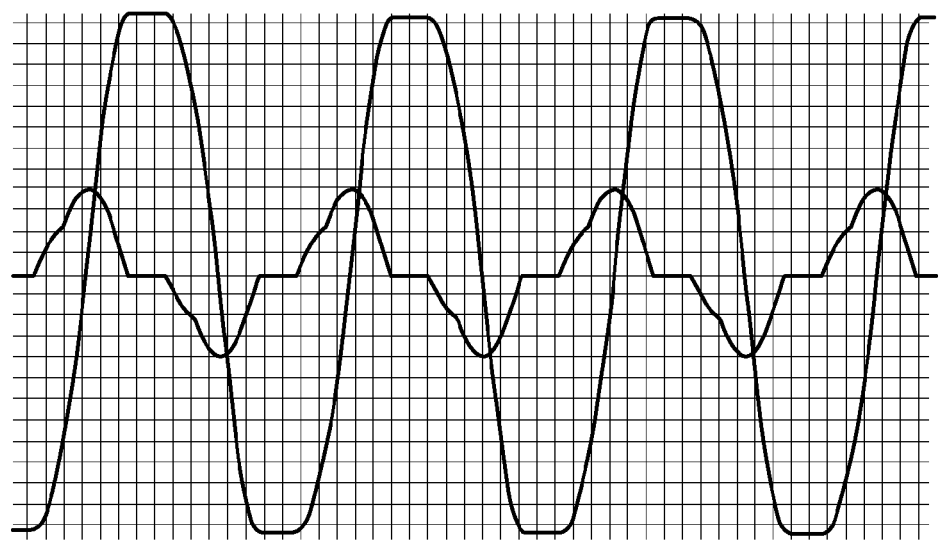
FIG. 9 represents plots of voltage and current across and through, respectively, the central link capacitor during four consecutive pulses of operation.

FIG. 8B is a simplified logic flow chart 830 illustrating operation of the internal command generator 401 and the user controller 412 of FIG. 4A. In FIG. 8B, the logic starts at a BEGIN block 832, and flows to a decision block 834, which determines the commanded mode of operation, with the possibilities being AC-to-DC, DC-to-AC in the voltage source mode, and DC-to-AC in the current-mode mode. If the AC-to-DC mode has been selected, the logic leaves decision block 834 by the AC/DC path 835 and flows to a block 836. Block 836 represents calculation of the amount of real current (Id) at port 42 required to regulate the DC bus voltage at port 14. From block 836, the logic flows to a block 838, which represents the calculation of the reactive current (Iq) required to maintain unity power factor (by default, or any other commanded phase angle/reactive power if the reactive power command value is set by the user) at port 42. If decision block 834 determines that the mode of operation is to be DC-to-AC in the voltage source mode, the logic leaves decision block 834 by the DC/AC voltage source mode path 839, and flows to a block 840. Block 840 represents the calculation of the amount of real current (Id) required to regulate the AC voltage at AC port 42. Block 842 represents the setting to zero of the Iq setpoint (since Iq will be determined from the load characteristics and cannot be controlled independently from Id). If decision block 834 decides that the commanded mode of operation is DC-to-AC in the current source mode, the logic flows by way of logic path 844 to a block 846. Block 846 represents the calculation of the real current Id required to follow the real power command. Block 848 represents the calculation of the amount of reactive current Iq required to follow/satisfy the user the reactive power command. From any one of blocks 838, 842, or 848, the logic 830 flows to an END block 850.

Figure 4B:
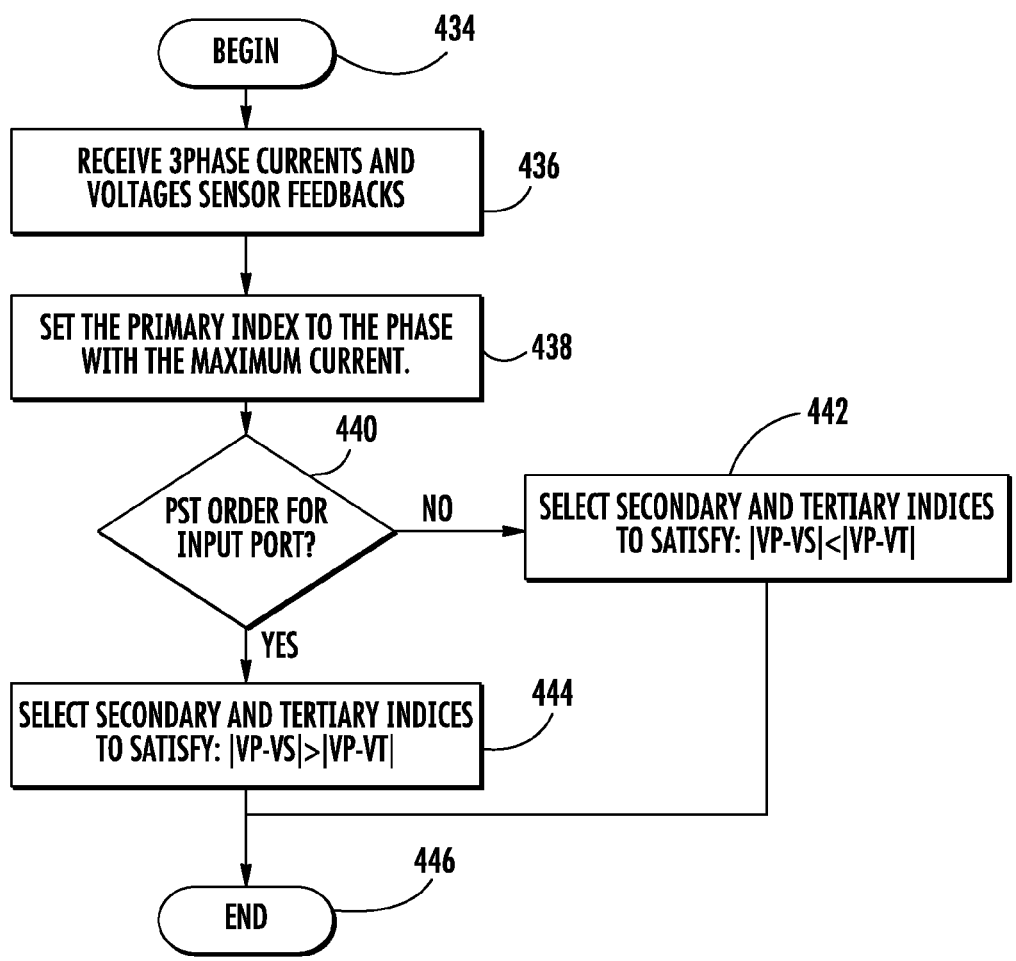
FIG. 4B is a simplified logic or command flow chart or diagram illustrating operation of a primary-secondary-tertiary selector of the controller of FIG. 4A.
Figure 4C:
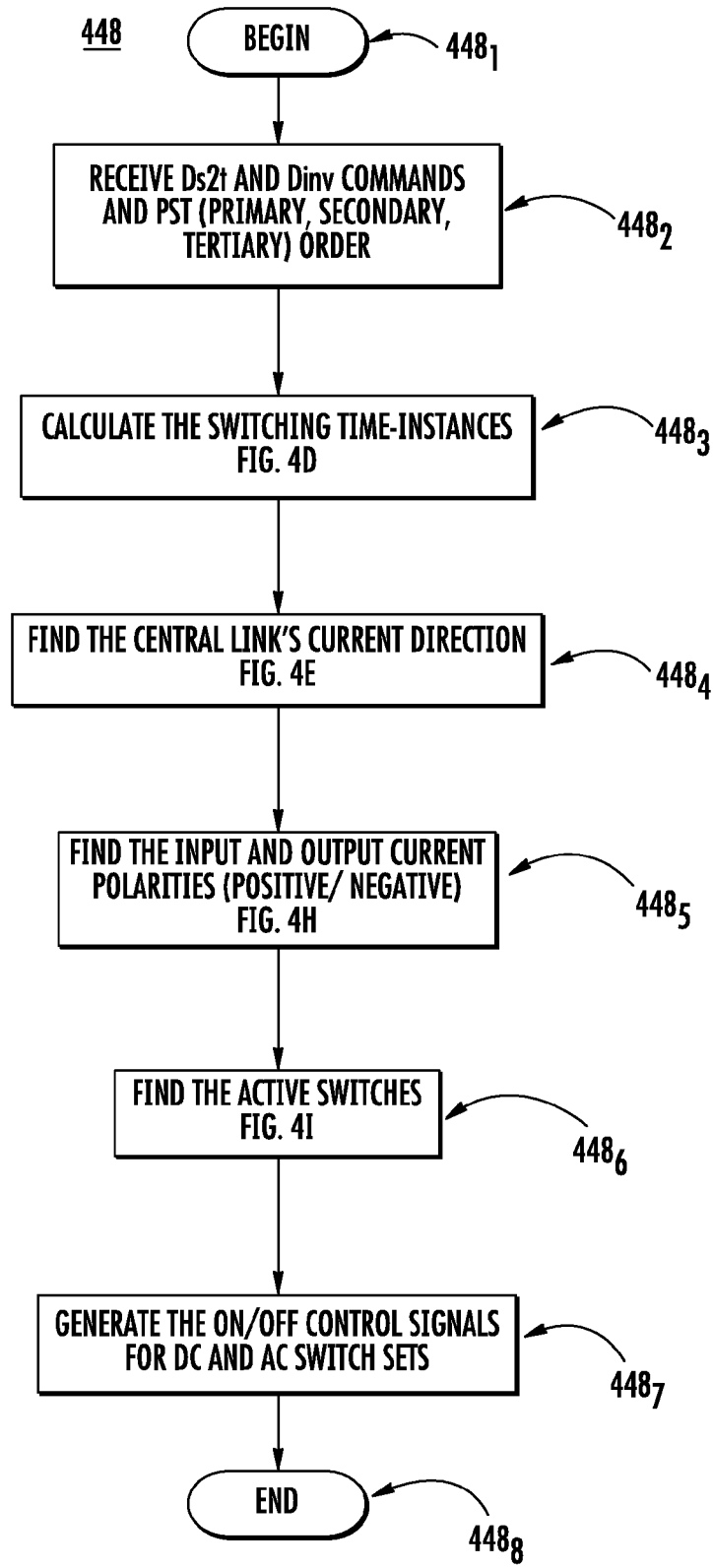
FIG. 4C is a simplified logic or command flow chart or diagram illustrating operation of a switch control signal generator of FIG. 4A.
Figure 4D:
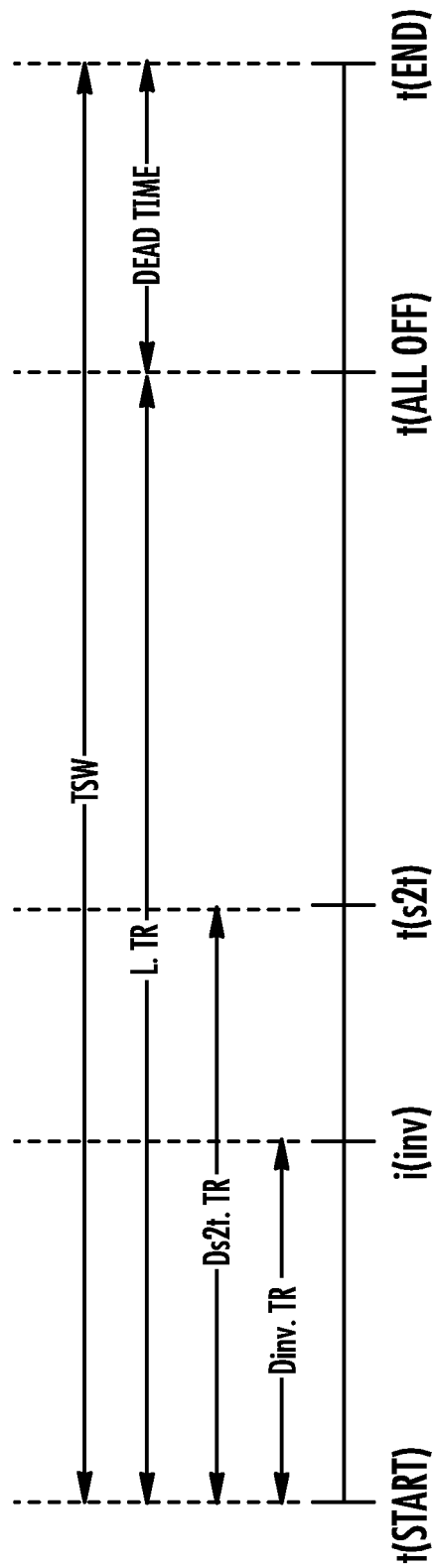
FIG. 4D is a time line for aiding in the explanation of the switching control times.
Figure 4E:
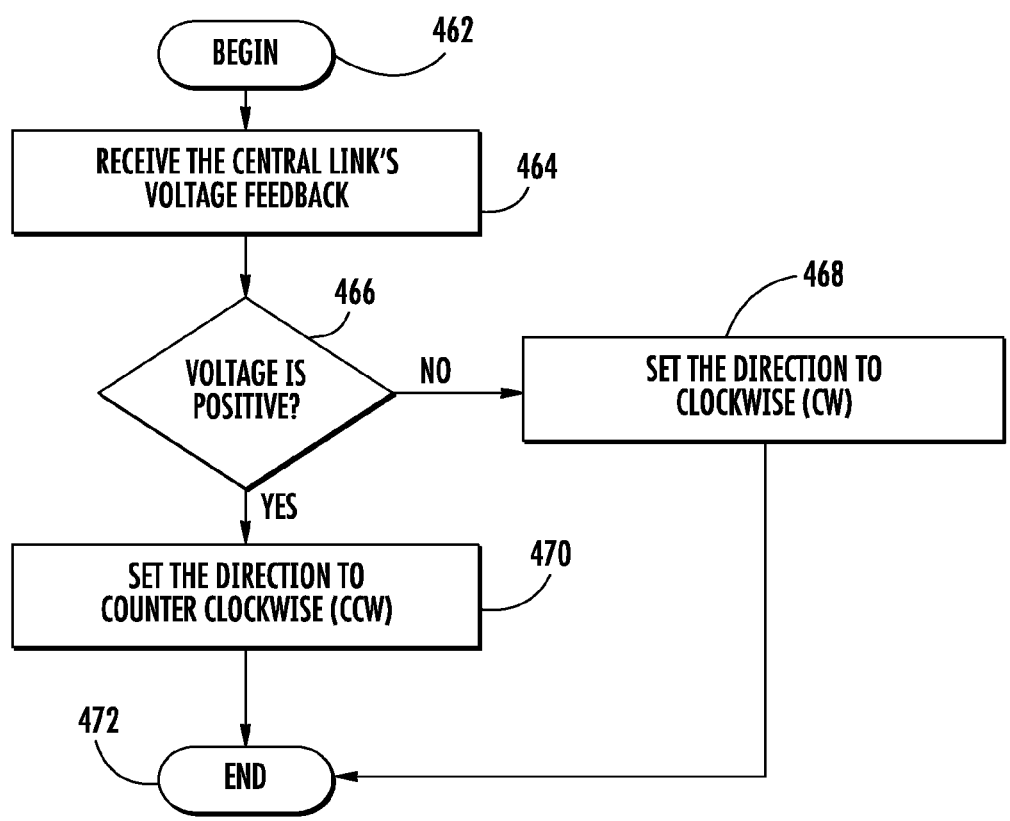
FIG. 4E is a simplified logic or command flow chart or diagram illustrating operation of a central link current direction determination of a switch-control-signal generator of FIG. 4A.

Referring again to FIG. 4A, the three-phase current command signals on bus 418 of the controller 410 of FIG. 4A are applied to a NORM2 ($\sqrt{i_a^2+i_b^2+i_c^2}$) function block 420 and to a primary-secondary ratio calculator 422. The NORM2 function block or norm calculator 420 and the primary-secondary ratio calculator 422 are both found in the Transverse AC (TAC) modulator 416. The primary-secondary ratio calculator 422 calculates the desired (set point) value or ratio of the secondary current to the primary current. In this context, "primary" current is the current of the primary phase and secondary current is the current of the secondary phase, which are selected by a primary-secondary-tertiary phase selector 428. The command NORM 2 (cmd norm) signal from NORM2 function block 420 is applied to a subtracting circuit 430, which also receives, by way of a path 429, a maximum possible command norm signal, representing the normalized nominal AC current. The output of subtracting circuit 430 represents the percentage of "inversion" time for the next following pulse. This percentage-of-inversion-time signal is applied to switch control-signals generator 456, which calculates the GTO switch control signals for DC switch superset 22. FIG. 4G is a simplified flow chart illustrating the overall operation of NORM2 function block 420, path 429, and subtracting circuit 430. The "inversion" percentage is a measure of the required limitation of the power throughput. For example, if the circuit is capable of producing 1 unit of nominal power and the user is requesting only 0.5 unit power, the power throughput has to be limited somehow to satisfy the user commands. This is accomplished by means of "inversion" (i.e. not passing any power by forming a short in the input port for a percentage of time during each pulse).

As mentioned, the Primary-secondary-tertiary phase selector 428 of FIG. 4A generates signals representing or identifying the three phases of the alternating port 42. The phase order signals are identified to ratio secondary/primary ratio calculators 422 and 426, and the switch control-signals generator 456. The ratio calculator 426 receives the phase order information from phase selector 428 and the three-phase grid (or load) current feedback by way of bus 450. The ratio calculator 426 performs the same function as the ratio calculator 422 on the actual (feedback) currents from port 42, to produce an actual current ratio as feedback to a proportional-integral processor (PI) 424, which processes the ratio set-point and the ratio feedback to produce secondary-to-tertiary time percentage adjustment. The three-phase current command signals on bus 418 are applied to ratio calculator 422, and are processed in ratio calculator 422 together with signals representing the order of the three phases from block 428, to produce a ratio set-point or desired set-point. The ratio set-point from ratio calculator 422 is applied to PI processor 424. PI block 424 also receives actual ratio feedback from ratio calculator 426. The ideal secondary-to-tertiary time percentage signal is equal to the ratio setpoint. The ideal value of, and the correction to, the secondary-to-tertiary time percentage are added together in an adder 432 to produce the secondary-to-tertiary time percentage as an input to the switch control-signals generator 456 to produce the secondary-to-tertiary time percentage command which represents the time instant in the next occurring pulse at which the transition between the secondary phase to tertiary phase will occur.

Figure 4F:
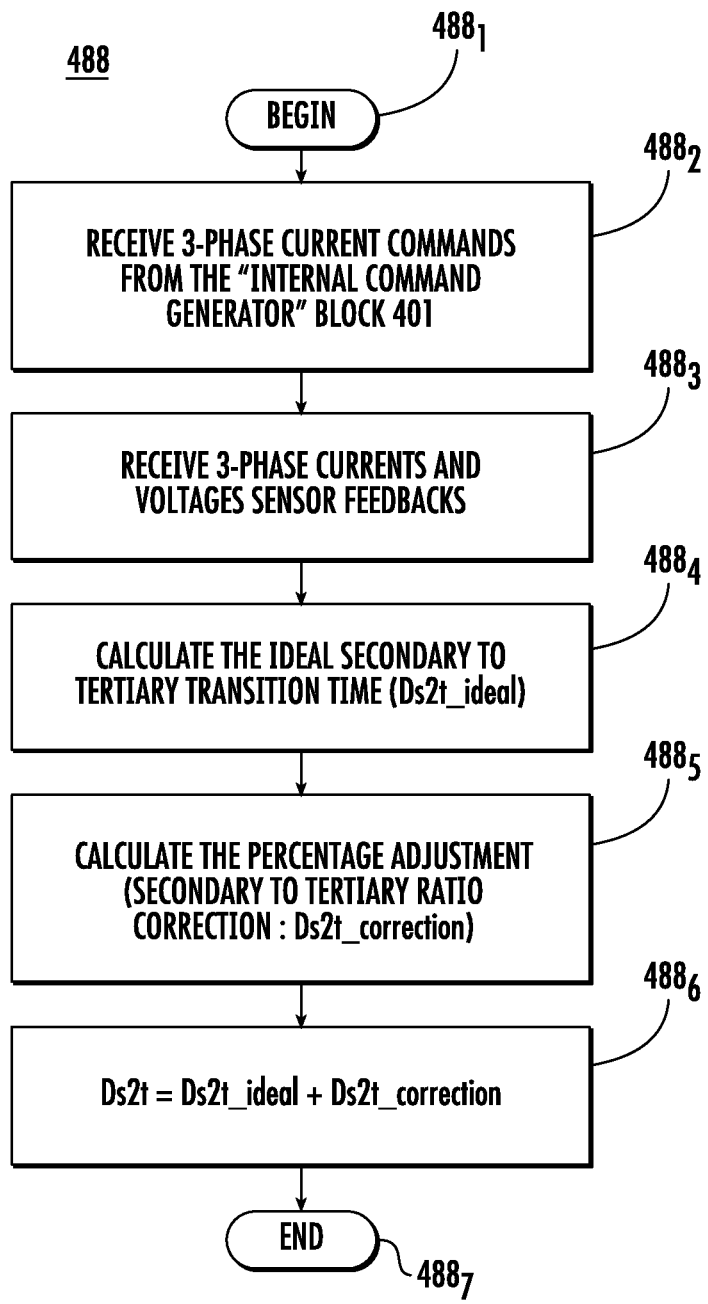
FIG. 4F is a simplified logic or control flow diagram or chart illustrating the logic associated with calculation of secondary-to-tertiary phase transition time.
Figure 4G:
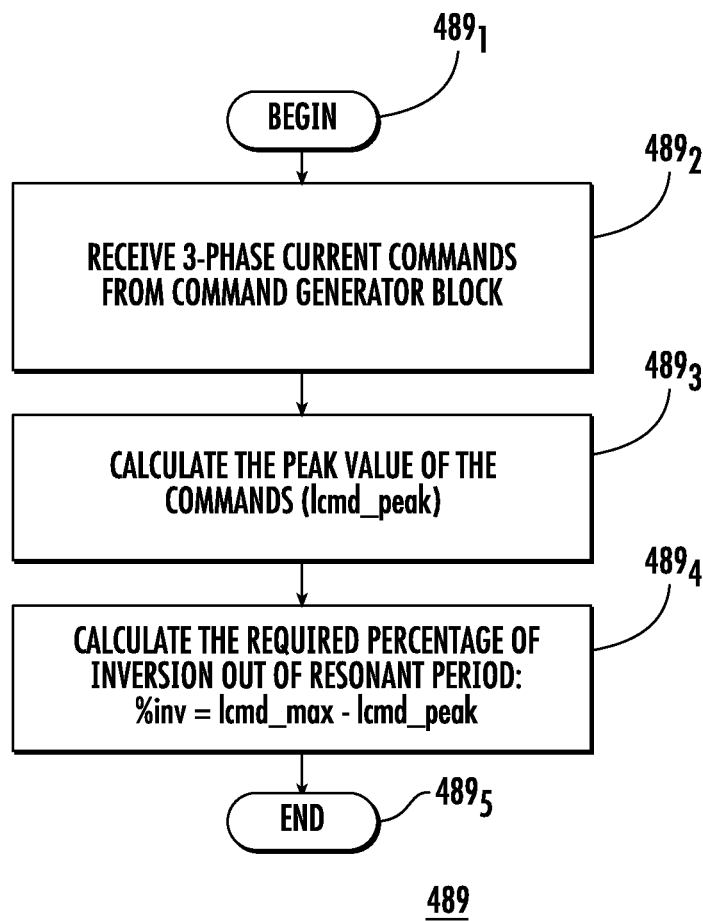
FIG. 4G is a simplified logic or control flow diagram or chart illustrating logic steps involved in calculating the required percentage of inversion out of a resonant period.

The flow chart of FIG. 4F sets forth the logic performed by ratio calculator 422, PI processor 424, ratio calculator 426, and adder 432 of FIG. 4A. In FIG. 4F, the logic 488 starts at a BEGIN block $488_1$, and flows to a block $488_2$. Block $488_2$ represents reception of the three-phase current commands from the internal command generator 401. Block $488_3$ represents the reception of three-phase current feedback and voltage feedback. Block $488_4$ represents the calculation of ideal secondary-to-tertiary transition time (Ds2t_ideal). Block $488_5$ represents calculation of the percentage adjustment (the secondary-to-tertiary ratio correction) or Ds2t_correction. Block $488_6$ represents calculation of the Ds2t time by $$D_{s2t}=D_{s2t_{Ideal}}+D_{s2t_{Correction}}$$

The logic of FIG. 4F ends at a block $488_7$.

FIG. 4G illustrates the logic 489 for determining the percentage of inversion time, as performed by the NORM2 function block 420, the path 429, the subtracting circuit 430, and the adder 432 of FIG. 4A. In FIG. 4G, the logic 489 starts at a BEGIN block $489_1$, and flows to a block $489_2$. Logic block $489_2$ represents reception of the 3-phase current commands from Internal Command Generator 401 of FIG. 4A. Block $489_3$ represents calculation of the peak value (norm) of the commands (Icmd_peak). Block $489_4$ represents calculation of the required percentage of inversion out of, or in, the resonant period, given by $$D_{inv}=I_{cmd_{max}}-I_{cmd_{peak}}$$

Logic 489 of FIG. 4G ends at an END block $489_5$.

FIG. 4B is a simplified flow chart illustrating the logic flow in phase identifier or primary-secondary-tertiary Selector (PST order) 428 of FIG. 4A. In FIG. 4B, the logic begins at a BEGIN block 434 and flows to a block 436. Block 436 represents receipt of sensor values representing the AC currents at port 42 and the AC filter capacitor 34 voltages. From block 436, the logic of FIG. 4B flows to a block 438, representing determination of the phase having the maximum absolute magnitude of instantaneous current, and deeming this phase to be the "primary" phase. Decision block 440 decides if the AC port is the input port or the output port, thereby allowing selection of the secondary and tertiary phases depending upon their voltages relative to the primary phase. If the AC port is the output port, the logic leaves decision block 440 by the NO output, and flows to a block 442. Block 442 selects the secondary and tertiary phases such that the voltage difference between primary and secondary phase should be smaller than the voltage difference between tertiary and primary.

$$|V_{Pri}-V_{Sec}|<|V_{Pri}-V_{Ter}|$$

If the AC port is the input port, the logic leaves decision block 440 by the YES output, and flows to a block 444. Block 444 selects the secondary and tertiary phases such that the voltage difference between primary and secondary phase is larger than the voltage difference between tertiary and primary.

$$|V_{Pri}-V_{Sec}|>|V_{Pri}-V_{Ter}|$$

The logic of FIG. 4B ends at an END block 446.

FIG. 4C illustrates the logic 448 performed in switch-control-signal generator 456 of FIG. 4A. In FIG. 4C, the logic begins at a BEGIN block $448_1$, and flows to a block $448_2$. Block $448_2$ represents reception of the primary, secondary, and tertiary phase order or identifications (pst order), and of the inversion percentage command (Dinv) and secondary-to-tertiary percentage command (Ds2t) signals. From block $448_2$, the logic 448 flows to a block $448_3$. Block $448_3$ represents the calculation of the switching times or instances. Block $448_4$ of FIG. 4C represents the determination of the current direction in the central link 26. Details of block $448_4$ are illustrated in conjunction with FIG. 4E. Block $448_5$ of FIG. 4C represents determination of the polarity of the switches in the input and output bridges or ports. Details of block $448_5$ are described in conjunction with FIG. 4H. The active switches are determined in block $448_6$ of FIG. 4C. Block $448_7$ represents the generation of the ON/OFF control signals for the control electrodes of the DC and AC switch sets. The logic of FIG. 4C terminates at an END block $448_8$.

FIG. 4D is a simplified time line illustrating salient times in the operation of the calculation in block $448_3$ of logic 448 of FIG. 4C. In FIG. 4D, the starting time of the next occurring pulse or time 0 is designated t(start). The system starts in the inversion mode rather than in the normal mode. In the inversion mode, the input port is shorted, and no power flows to the central link or tank 26 from the input port in order to control (reduce) the power throughput. In the normal mode, the input port goes back to normal (non-shorted) operation to pass the power to the output port through the central link. It should again be emphasized that the "input" and "output" ports depend upon the operating mode. As mentioned above, Dinv is the inversion percentage. In order to find the real time instant, i.e. t(inv), at which the transition to normal operation takes place, the inversion percentage is multiplied by the resonant period Tr (in seconds) to produce Dinv·Tr. That is, the inversion to normal transition happens at a time t(inv) calculated by adding the inversion period duration or length to the start time t(start). Inversion period is calculated by multiplying the inversion percentage Dinv by the resonant period length Tr (in seconds) to generate the inversion period shown by "Dinv·Tr" in FIG. 4D. The inversion mode of operation ceases, and operation in the normal mode begins, at time t(inv) of FIG. 4D. Similarly for finding the secondary-to-tertiary transition time t(s2t), the required period, shown by "Ds2t·Tr" in FIG. 4D, is calculated by multiplying the secondary-to-tertiary percentage Ds2t by resonant period Tr to find the time instant t(s2t) as a product, and adding the product to the start time t(start). Beginning at time t(s2t), the secondary phase will gradually stop feeding the primary phase and the tertiary phase will continue feeding the primary instead of the secondary phase. The gradual transition is because of the presence of the commutation inductors (inductors of sets 18 or 34). Time Tsw represents the switching period. The pulse length, in seconds, is shown by "L·Tr" in FIG. 4D, where L is a constant which is set at a value slightly larger than the maximum inversion required in each power-level plus one "1+max(Dinv)", to make sure no hard-switching event can occur. For making the pulse period equal to the required switching period "Tsw", an extra amount of dead-time is added to the end of the pulse where Dead-time=Tsw−L·Tr.

As mentioned in conjunction with FIG. 4C, logic 448 flows to a block 448$_1$, which represents determination of the current flow direction in central link 26 of FIG. 1A, 1B or 2. This is accomplished by the logic 461 of FIG. 4E. In FIG. 4E, the logic starts at a BEGIN block 462, and flows to a block 464, which represents receipt of voltage feedback from the central link 26 voltage sensor 26A. From block 464, logic 461 flows to a decision block 466, which determines whether the central link voltage is positive. If the central link voltage is not positive, the logic leaves decision block 466 by the NO output, and arrives at a block 468. Block 468 represents the determination that the current flow is clockwise (CW). If the central link voltage is positive, the logic leaves decision block 466 by the YES output and arrives at a block 470, representing a determination that the current flow in the central link is counterclockwise (CCW). Logic 461 of FIG. 4E ends at END block 472, and the logic returns to block 448$_5$ of FIG. 4C.

Figure 4H:
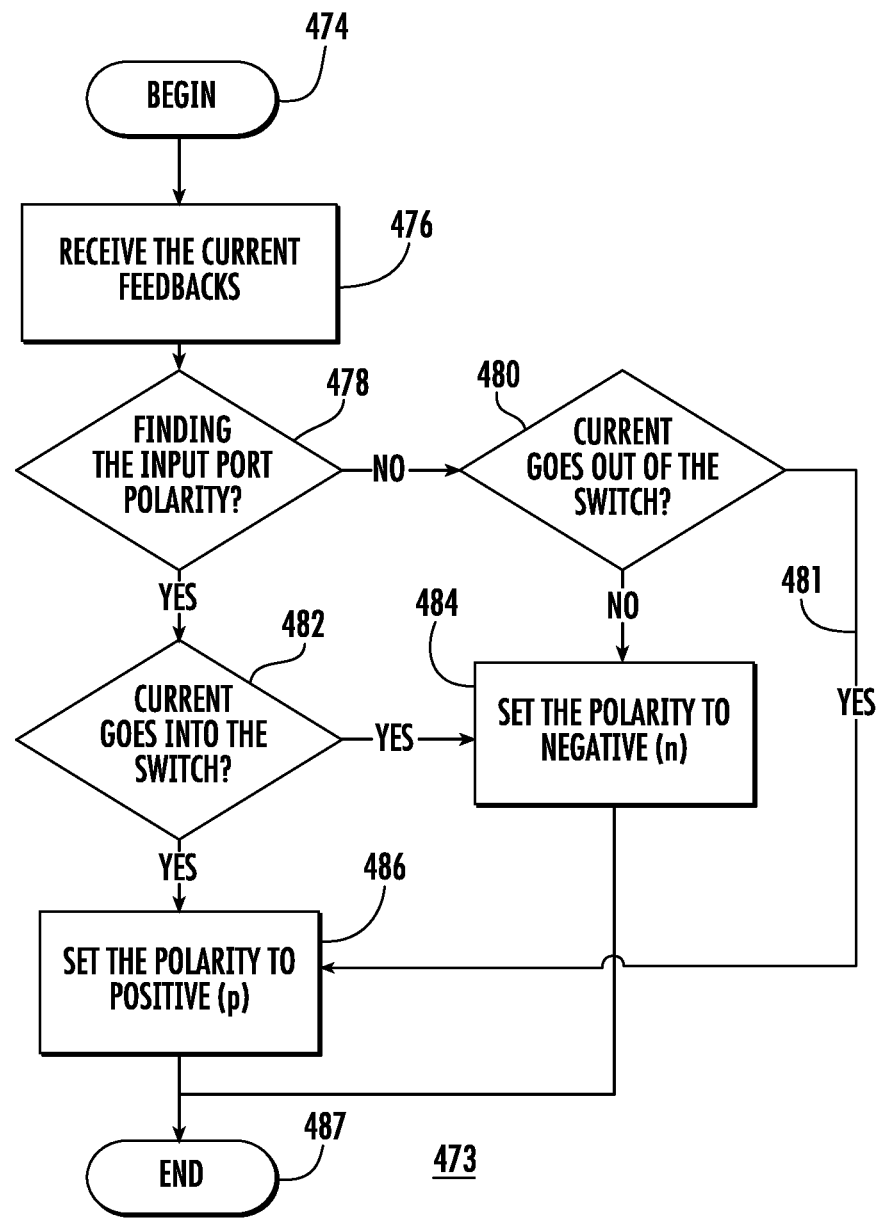
FIG. 4H is a simplified logic or control flow diagram or chart illustrating the logic for determining the current polarity in the switches.

As mentioned, block 448$_5$ of FIG. 4C represents determination of the positive or negative polarities of the input and output currents. FIG. 4H is a simplified logic flow chart or diagram illustrating the logic 473 of block 448$_5$ of FIG. 4C. In general, the DC port polarity is set to positive either when there is a load (such as resistor 13 of FIG. 1B) connected to the DC capacitor 18c or when a battery is connected and it is being charged. The DC polarity is set to negative if the battery is being discharged. AC port polarity is determined by the polarity of the primary current, the polarity is deemed to be positive if the primary current is positive and negative otherwise. Put another way, the polarities of the input and output currents are defined as: for the output (AC or DC) port, positive direction is the direction of exiting the switches and for the input port (DC or AC) it is the direction of entering the switches. The logic 473 of FIG. 4H starts at a BEGIN block 474, and flows to a block 476, representing the reception of the current feedback signals. From block 476, logic 473 flows to a decision block 478. Decision block 478 decides whether the polarity is being calculated for the input port or for the output port. If it is for the output port, the logic leaves decision block 478 by the NO path, and if it is for the input port, the logic leaves block 478 by the YES path. The NO output path of decision block 478 leads to a further decision block 480. Decision block 480 determines if current flows out of the switch in question. If current flows out of the switch, the logic leaves decision block 480 by the YES path and flows to a block 486, representing the setting or determination of the polarity as being positive (p). If current flows into the switch, the logic leaves decision block 480 by the NO path and flows to a block 484, representing the setting or determination of the polarity as being negative (n). The YES output path of decision block 478 leads to a further decision block 482. Decision block 482 determines if current flows into the switch in question. If current flows into the switch, the logic leaves decision block 482 by the YES path and flows to block 484, representing the setting or determination of the polarity as being negative (n). If current flows out of the switch, the logic leaves decision block 482 by the NO path and flows to block 486, representing the setting or determination of the polarity as being positive (p). Logic 473 ends at an END block 487, and returns to block 448$_5$ of FIG. 4C.

To summarize the operation of an arrangement according to an aspect of the disclosure, assume that each switch can be described by the triplet $$[I_{direction}, I_{polarity}, \text{phase order}]$$

where:
1. "$I_{direction}$" is the current direction in the central link, which can be either CW=1 or CCW=2; reverse polarity is shown with "$\overline{I_{direction}}$" throughout the text.
2. "$I_{polarity}$" is the port polarity, which can be either P=1 or N=2; reverse polarity is shown with "$\overline{I_{polarity}}$" throughout the text.
3. phase order is the same as the pst order for the AC port, and for the DC port, primary DC phase is arbitrarily defined as the top DC switch set in the circuit schematic and the secondary DC phase as the bottom switch set.

For the AC port, this triplet yields twelve (12) different combinations, namely 2 possible directions, 2 polarities, and 3 phase orders, which correspond to or result in, 2*2*3=12 switch combinations, and in a similar manner it yields six (6) different switch combination for the DC port.

If operating in AC-to-DC (AC/DC) mode, each switching pulse can be divided into three separate switching portions for the input (AC) port:
1. The first switching portion of the pulse is the inversion period (t(start)<time<t(inv)), in which two switches with different polarities from the primary switch set are active: [$I_{direction}$, $I_{ac_{polarity}}$, AC primary] and [$I_{direction}$, $\overline{I_{ac_{polarity}}}$, AC primary].
2. The input port enters the normal sequence after passing the t(inv) time, and enters the second portion of the pulse (t(inv)<time<t(s2t)) by activating the secondary phase switch [$I_{direction}$, $\overline{I_{ac_{polarity}}}$, AC secondary] which makes the current flow through this switch and through [$I_{direction}$, $I_{ac_{polarity}}$, AC primary] which was activated at the beginning of the first portion of the pulse.
3. The third portion of the pulse starts upon reaching time t(s2t). At this time the tertiary phase switch [$I_{direction}$, $\overline{I_{ac_{polarity}}}$, AC tertiary] becomes active and gradually starts conducting the current instead of the secondary phase switch. From this time t(s2t) to the end of the switching pulse, current flows through this tertiary switch and through [$I_{direction}$, $I_{ac_{polarity}}$, AC primary] which was activated in the first portion of the pulse.

DC port current flows through the primary and secondary DC phase switches [$I_{direction}$, $I_{dc_{polarity}}$, DC primary] and [$I_{direction}$, $\overline{I_{ac_{polarity}}}$, DC secondary] for the entire pulse, which is to say during all three portions of the pulse.

If operating in DC/AC operation modes (voltage or current source modes), each switching pulse can be divided into two separate switching portions for the input (DC) port and into two separate switching portions for the output (AC) port. The DC (input) port operation separates the pulse into two portions around the inversion transition time t(inv) and the AC (output) port operation separates the pulse into two portions around the secondary to tertiary transition time t(s2t).

During the first DC pulse portion in the interval t(start) <time<t(inv), DC port enters the inversion mode by activating two switches with different polarities from among the switches of the primary DC switch set: [$I_{direction}$, $I_{dc_{polarity}}$, DC Primary] and [$I_{direction}$, $\overline{I_{dc_{polarity}}}$, DC primary] to block the current from the DC input port. Upon entering the second DC portion at time t(inv), the secondary phase DC switch [$I_{direction}$, $\overline{I_{dc_{polarity}}}$, DC secondary] becomes active for letting the current flow from the input port to the central link through this secondary phase switch and the primary switch [$I_{direction}$, $I_{dc_{polarity}}$, DC Primary] which was activated at the beginning of the first portion of the pulse.

During the first AC pulse portion in the interval t(start) <time<t(s2t), AC port current flows through the primary and secondary AC phase switches [$I_{direction}$, $I_{dc_{polarity}}$, AC primary] and [$I_{direction}$, $\overline{I_{dc_{polarity}}}$, AC secondary]. The second AC pulse portion starts upon reaching the t(s2t) time. At this time the tertiary phase switch [$I_{direction}$, $\overline{I_{dc_{polarity}}}$, AC tertiary] becomes active and gradually starts conducting the current instead of the secondary phase switch. From time t(s2t) to the end of the switching pulse, current flows through this tertiary switch and through [$I_{direction}$, $I_{dc_{polarity}}$, AC primary] which was activated in the first portion of the pulse. Note that none of the switches are turned OFF before the t(all off) event. The primary phase is the phase which has the largest absolute value of current $$|I_{primary}| > |I_{secondary}|$$

$$|I_{primary}| > |I_{tertiary}|$$

In order for switch commutation to occur, the secondary and tertiary phases are selected based on the AC voltages, satisfying, in the case of the AC port being the output port $$|V_{primary} - V_{secondary}| < |V_{primary} - V_{tertiary}|$$

and in the case of the AC port being the input port $$|V_{primary} - V_{secondary}| > |V_{primary} - V_{tertiary}|$$

Figure 4I:
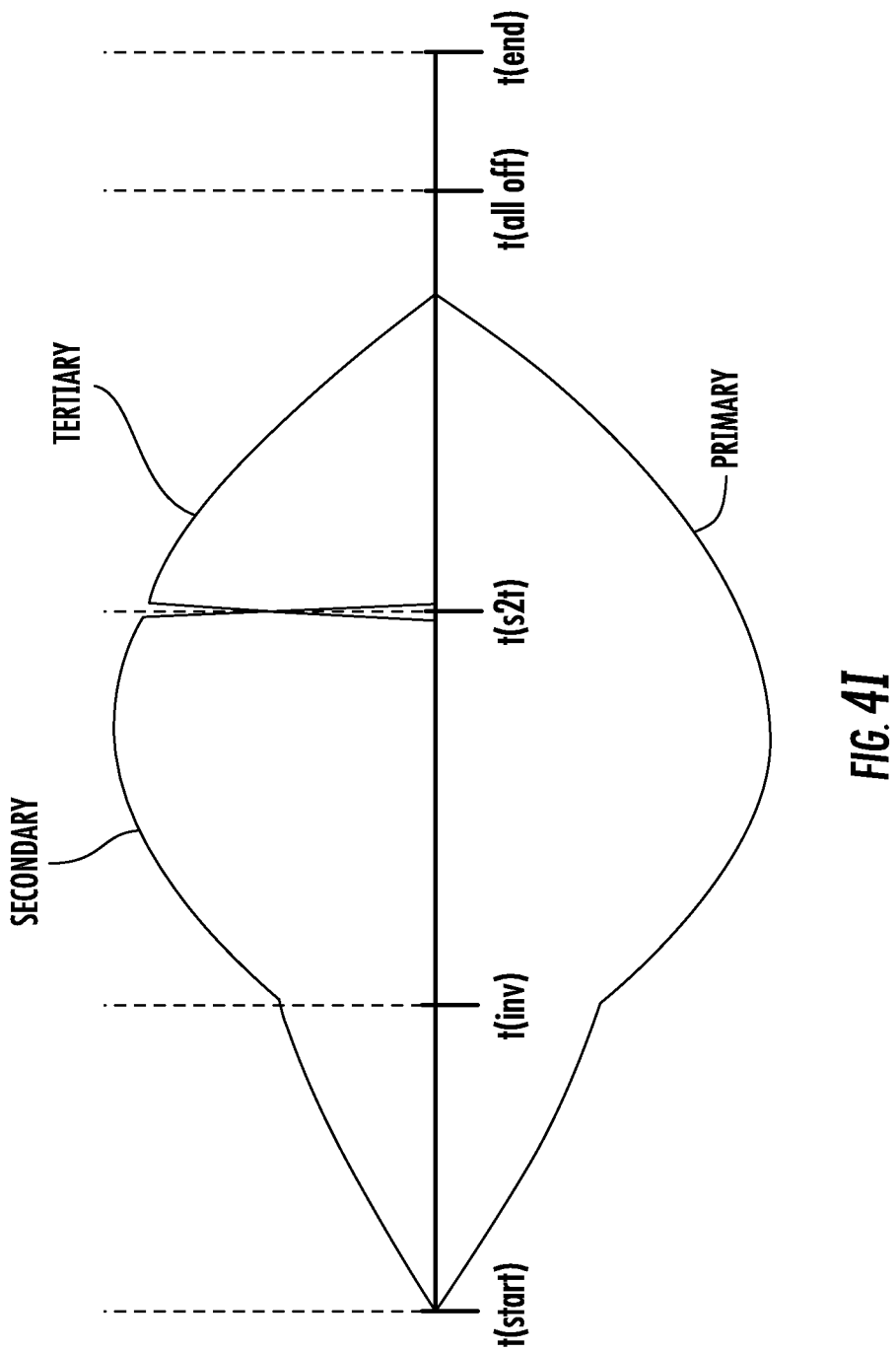
FIG. 4I illustrates plots of primary, secondary and tertiary current in the arrangement of FIG. 4A.

From block $448_5$ of FIG. 4C, logic 448 flows to a block $448_6$. Block $448_6$ represents the identification of the active switches. The identification of the active switches is explained with reference to FIG. 4I. The primary, secondary and tertiary phases are designated as such. FIG. 4I represents the 3-phase AC currents flows through the primary, secondary and tertiary phases over a single switching period, assuming that the inverter is operating in the DC/AC operation modes, and hence the inversion sequence occurs at the DC (input) port. The central link's current has the exact same shape as the primary current in this case, but out-of-phase every other pulse. Note that at time t(s2t) the secondary current starts to be gradually replaced by the tertiary current. During the normal operation sequence, two AC phases are active at the same time. The system always starts in the inversion state, unless the required amount of inversion ($D_{inv}$) is zero. In inversion state, the input port operates in inversion and the output port operates in normal sequence. After reaching t(inv) time, the system enters the normal operation mode in the input port and the output port keeps operating in normal mode as before. In the AC-to-DC (AC/DC) operating mode, the AC port starts operating by activation of two different switches from the AC primary switch set (one with positive and the other one with negative polarity), and no activation of switches from secondary or tertiary switch sets. By switching in this way, a short circuit is generated at the input (AC) port which prevents the power from flowing from the AC source to the central link. Normal sequence starts after the inversion transition time t(inv) is reached. In Normal mode either secondary or tertiary phase feeds the primary phase. Normal sequence starts with activation of a switch from the secondary phase switch set and conducting the current through primary and secondary. When the secondary-to-tertiary transition time t(s2t) has been reached, a switch with the same polarity and direction as the secondary phase switch from the tertiary phase is activated. Due to the presence of the AC commutation inductors, the current flowing through secondary phase switch gradually goes to zero and tertiary phase current gradually increases. For the rest of the pulse time, tertiary and primary phase switches are active in the AC input port. The DC port operates in normal condition for the whole duration of the pulse since it is in the output port. DC active switches are selected to satisfy the polarity and current direction as explained above. In the DC-to-AC (DC/AC) operating mode, either voltage or current source, the DC port starts operating by activating two different switches from the DC primary switch set (one with positive and the other one with negative polarity), and with no switch from the secondary switch set. By switching in this way, a short circuit is produced or performed in the input (DC) port, which prevents the flow of power from the DC source to the central link. Normal sequence starts after the inversion transition time t(inv) is reached, and at that time the secondary DC phase starts feeding the primary DC phase. The AC port operates in normal condition for the whole duration of the pulse since it is in the output port. AC active switches are selected to satisfy the polarity and current direction, as explained above.

Once the active switches are identified in block $448_6$ of FIG. 4C, the ON/OFF control signals for DC and AC switch sets are determined in block $448_7$, thereby satisfying the active switch selections and the switch timing instances. The logic 448 ends at an END block $448_8$.

Figure 5:
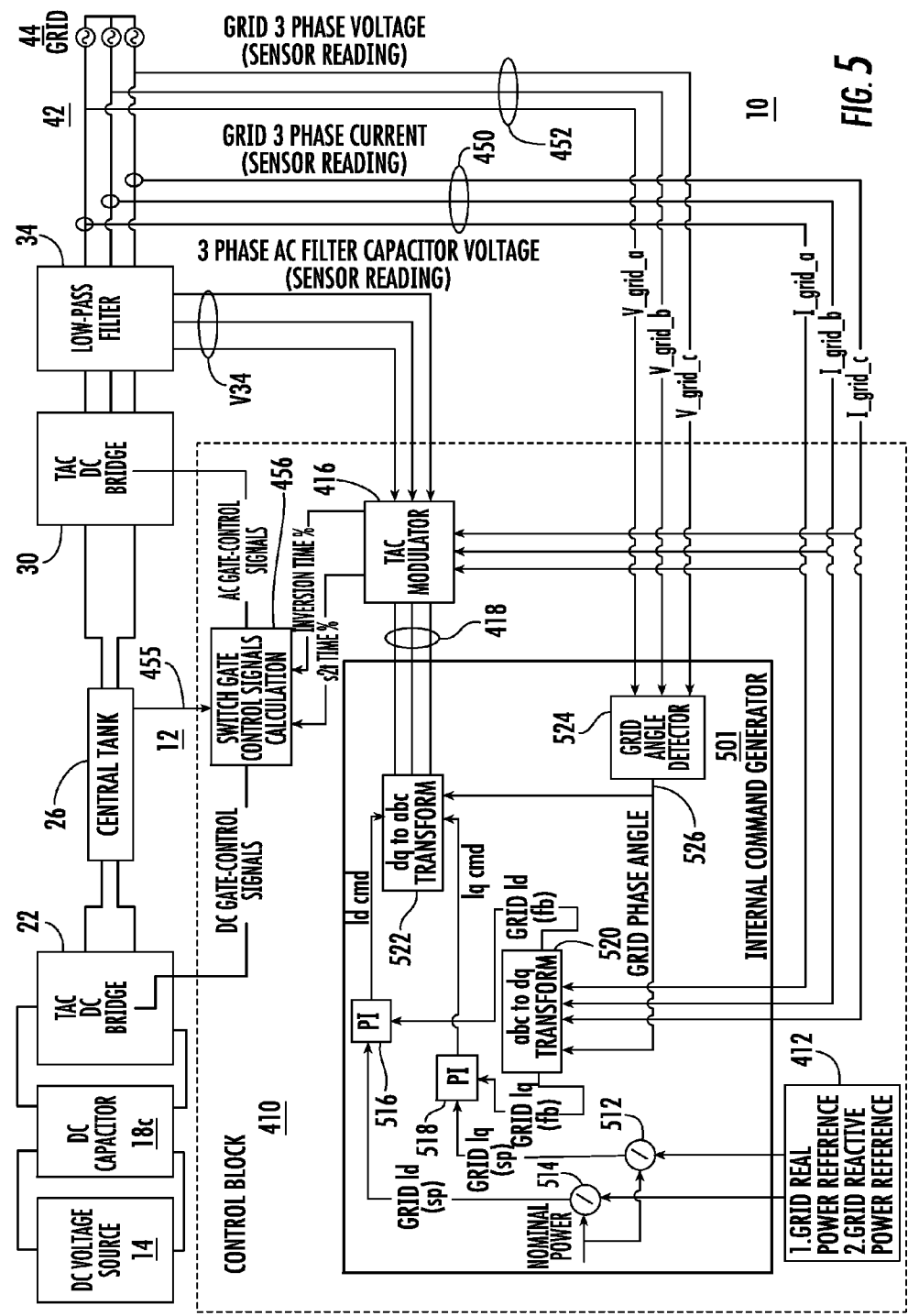
FIG. 5 is a diagram in block and schematic form, similar to FIG. 4A, showing details of the internal command generator for the power converter for use in a DC-to-AC-current-source-mode situation.
Figure 6:
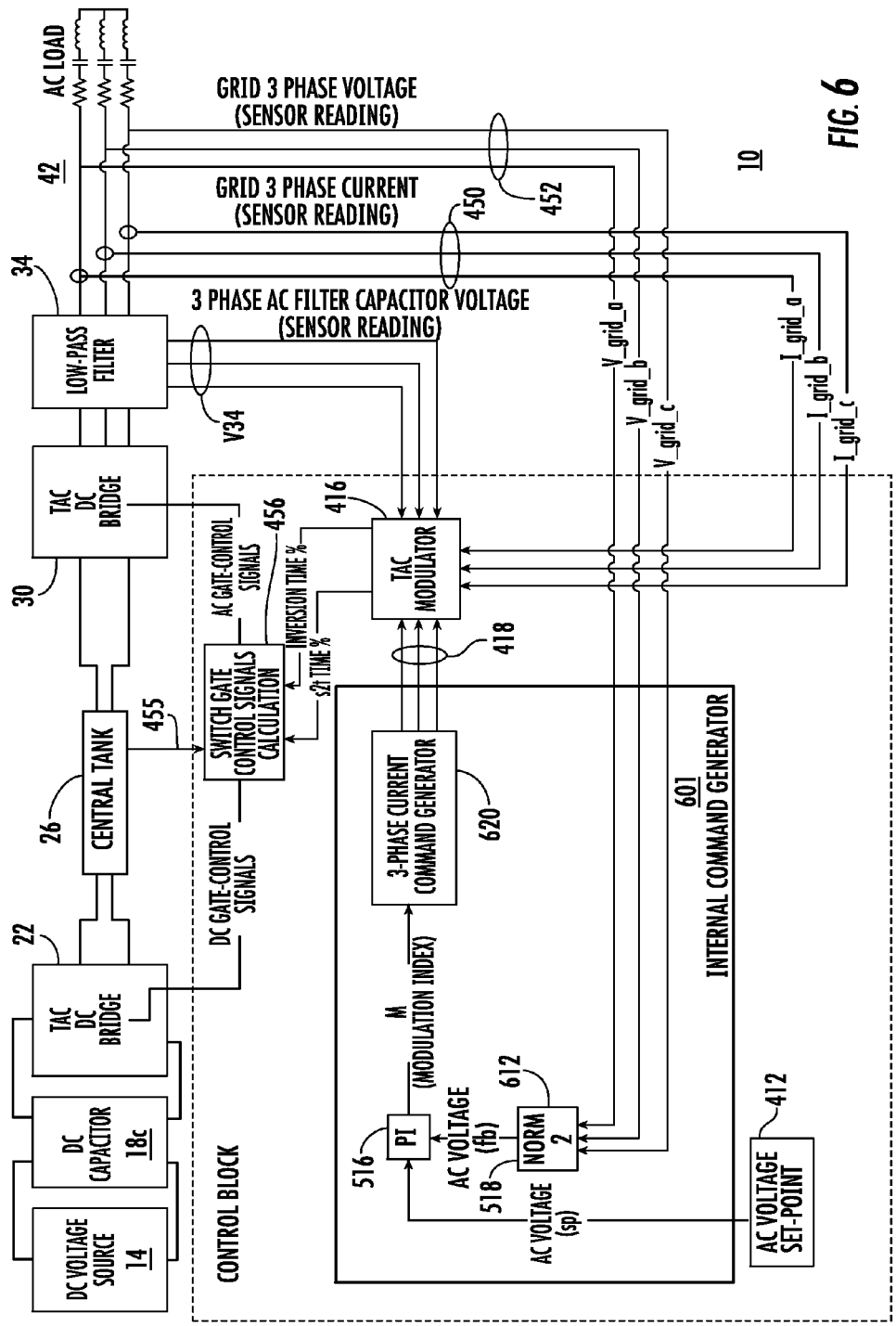
FIG. 6 is a diagram in block and schematic form, similar to FIG. 4A, showing details of the internal command generator for the power converter for use in a DC-to-AC-voltage-source-mode situation.

FIGS. 5, 6, and 7 illustrate details of the internal command generator 401 of FIG. 4A for the DC-to-AC current mode, the DC-to-AC voltage mode, and the AC-to-DC operating modes, respectively. Since the makeup of the internal command generators differ from one to the other depending upon the application to which the power converter 10 is put, the designations of the internal command generators differ in FIGS. 5, 6, and 7. More particularly, the internal command generator of FIG. 5 is designated 501, the internal command generator of FIG. 6 is designated 601, and the internal command generator of FIG. 7 is designated 701.

FIG. 5 illustrates details of the internal command generator 401 (of FIG. 4A) for the case of operation of the power converter 10 for DC-to-AC-grid current source mode of operation (that is, with the three-phase grid 44 applied to the AC terminals 42). To distinguish the internal command generator as configured for this specific use from other internal command generators described below, the internal command generator of FIG. 5 is designated 501. As mentioned, in the DC-to-AC-current-mode of operation, power can only be transferred to the grid by driving it with current, as the internal impedance of the grid is nominally zero. In FIG. 5, elements corresponding to those of FIG. 4A are designated by like reference alphanumerics. In FIG. 5, block 412 produces the grid real and reactive power references or setpoints. The real and reactive power references are applied from block 412 to division circuits 512 and 514, respectively, of internal command generator 501. Division circuits 512 and 514 also receive nominal power reference signals. Division circuits 512 and 514 divide the user commanded real and reactive power by the nominal power to normalize the commanded signals and to thereby generate the real (grid Id) and reactive (grid Iq) current setpoints. The real current setpoint (Grid $I_d$ setpoint) is applied to a PI block 516, and the reactive current setpoint (grid Iq) is applied to a PI block 518, together with real (grid Id fb) and reactive (grid Iq fb) current feedback signals, respectively, from block 520. PI blocks 516 and 518 produce the real and reactive current commands Id cmd and Iq cmd, respectively. Block 520 receives the sampled grid currents from sample path 450 and the grid phase angle from a block 524, and performs the Clarke-Park (abc-to-dq) transform to transform the three-phase grid current to Id and Iq feedback. The grid phase A voltage angle is determined by block 524 based on the sampled grid voltages from sample path 452. Transform block 522 receives the grid phase angle and the real and reactive current commands, and performs the reverse Clarke-Park transform (that is, dq-to-abc transform) to generate the three-phase current command signal on path 418 for application to TAC modulator 416.

FIG. 6 illustrates details of the internal command generator for the case of operation of the power converter 10 for DC-to-AC-load voltage source mode (that is, with the three-phase load applied to the AC terminals 42. In FIG. 6, elements corresponding to those of FIG. 4A are designated by like reference alphanumerics. In FIG. 6, block 412 produces the AC voltage setpoint for application to a PI block 516 of internal command block 601. A NORM2 block 612 receives three-phase AC load voltage reference signals for load phases a, b, and c, and determines the peak AC voltage magnitude by $\sqrt{v_a^2+v_b^2+v_c^2}$. The peak AC-voltage-representative feedback signal is applied from block 612 to proportional-integral (PI) block 516. PI block 516 produces M, the modulation index, for application to a 3-phase current command generator 620. The modulation index represents the magnitude of the three-phase current commands which are applied to TAC modulator block 416. Three-phase current command generator 620 acts on the modulation index M and the desired output phase angle to generate the three-phase current commands for application by way of paths 418 to TAC modulator 416.

Block 620 internally generates α, which is the desired output load voltage angle, which increments from a value of zero (0) at start-up, with the rate of increment $$120\pi/f_{sw}$$

where $f_{sw}$ is the switching frequency. The three-phase current command generator 620 calculates the three phase current commands as $I_{a\ cmd}$=M cos(α), $I_{b\ cmd}$=M cos(α+2π/3), $I_{c\ cmd}$=M cos(α−2π/3).

FIG. 7 illustrates details of the internal command generator 401 (of FIG. 4A) for the case of operation of the power converter 10 for AC-grid-to-DC operation (that is, with the three-phase grid 44 applied to the AC terminals 42 and a load connected to DC port 14). To distinguish the internal command generator as configured for this specific use from other internal command generators described herein, the internal command generator of FIG. 7 is designated 701. As mentioned, in the AC-to-DC mode of operation, the grid voltage is fixed, and power is extracted from the grid by controlling the AC current. In FIG. 7, elements corresponding to those of FIG. 4A are designated by like reference alphanumerics. In FIG. 7, block 412 produces the DC voltage setpoint and the grid reactive power reference (which may be set to zero if not otherwise specified). The reactive power reference is applied from block 412 to division circuit 512 of internal command generator 701. Division circuit 512 also receives nominal power reference signals. Division circuit 512 divides the user commanded reactive power by the nominal power to normalize the commanded signals and to thereby generate the reactive (grid Iq) current setpoints. The DC voltage setpoint is applied from block 412 to a PI block 516, which also receives a sample of the DC voltage. The reactive current setpoint (grid Iq) is applied from block 512 to a PI block 518. PI block 518 also receives reactive (grid Iq fb) current feedback signals from block 520. Block 520 receives the sampled grid currents from sample path 450 and the grid phase angle from a block 524, and performs the Clarke-Park (abc-to-dq) transform to transform the three-phase grid current to Id and Iq feedback signals, but in the AC-to-DC mode of operation only the reactive current Iq is used. PI blocks 516 and 518 produce the real and reactive current commands Id cmd and Iq cmd, respectively. The grid phase A voltage angle is determined by block 524 based on the sampled grid voltages from sample path 452. Transform block 522 receives the grid phase angle from path 516 and also receives the real (Id cmd) and reactive (Iq cmd) current commands, and performs the reverse Clarke-Park transform (that is, dq-to-abc transform) to generate the three-phase current command signal on path 418 for application to TAC modulator 416.

A power converter according to an aspect of the disclosure comprises a DC port, an AC port, a central resonant circuit, and a set of controllable "DC" switches coupled to the DC port and to the central resonant circuit. The power converter also comprises a filter coupled to the AC port and a set of "AC" switches coupled to the central resonant circuit and to the filter. The filter generates a voltage during operation of the converter. A switch control-signals generator is coupled to the DC and AC switches, and is responsive to phase order, to secondary-to-tertiary time percentage, and to inversion time percentages for controlling inversion and normal conduction times of the DC and AC switches. A modulator is responsive to the voltage of the filter, to current command signals, and to the current at the AC port, for generating the phase order, inversion time percentage and secondary-to-tertiary time percentage. The central resonant circuit may be a series resonant circuit. In a particular embodiment of the converter, the modulator comprises a primary-secondary-tertiary selector coupled to the filter for determining the phase order, and a norm calculator coupled to receive the current command signals, for generating normalized current command signal. A subtractor is coupled to the norm calculator for subtracting the normalized current command signal from signal representing a maximum possible value of the current command signal, to thereby generate the inversion time percentage. A secondary-to-primary current ratio calculator is coupled to receive the current command signals, and is also coupled for receiving the phase order, for generating ideal secondary-to-primary ratio. A secondary-to-primary current ratio calculator is coupled to receive the phase order, and is also coupled to receive a sample of the current at the AC port, for generating actual secondary-to-primary ratio. A proportional-integral processor is coupled for receiving the ideal and actual secondary-to-primary ratios, for generating secondary-to-tertiary percentage adjustment signal, and a summing processor is coupled to receive the actual secondary-to-primary ratio and is also coupled to receive the secondary-to-tertiary percentage adjustment signal, for summing a secondary-to-primary percentage adjustment signal with the ideal secondary-to-primary ratio to thereby produce the secondary-to-primary time percentage. In another embodiment of the converter, the switch control-signals generator responsive to phase order, to secondary-to-tertiary time percentage, and to inversion time percentage for controlling the inversion and normal conduction times of the DC and AC switch supersets comprises (a) a switching time calculator for receiving the secondary-to-tertiary transition time and the inversion time, and for calculating the switching times therefrom, (b) a current direction determining arrangement for finding the central link current direction, (c) a current polarity determining arrangement for determining the input and output current polarities), (d) an active switch finder for finding the active switches, and (e) a signal generator for generating the ON and OFF switch control signals for the active switches.

A controller for a power converter according to another aspect of the disclosure includes a direct voltage port and a three-phase AC port, and also includes a low-pass filter. The low-pass filter includes a low-pass filter first port and a low-pass filter second port, with the low-pass filter second port being coupled to the three-phase port of the converter. The low-pass filter also includes a set of filter sample voltage connections coupled for sampling low-pass filter voltages. The power converter includes a resonant central link which may be series-resonant. The power converter also includes first and second controllable switch sets. The first switch set connects the direct voltage port to the central link, and the second controllable switch set connects the central link to the low-pass filter first port in each of three possible operating modes. The power converter also includes alternating voltage and current sensors coupled to the alternating port, for generating samples of the alternating voltage and current, respectively. The power converter also includes a direct voltage sensor coupled to the direct voltage port for generating samples of the direct voltage. In a first of the possible operating modes power is transferred from the direct voltage port to the alternating port with controlled real and reactive power. In the second possible operating mode, power is transferred from the direct voltage port to the three-phase port with constant peak three-phase voltage, and in the third possible operating mode, power is transferred from the three-phase port to the direct voltage port. The controller comprises a switch element controller for generating ON-OFF control signals for the first and second controllable switch sets in response to inversion and secondary-to-tertiary time percentages. A modulator is responsive to the filter voltage and to the current at the AC port, for generating the inversion and secondary-to-tertiary time percentages. In an embodiment, the resonant circuit is series-resonant.

A power converter according to a yet further aspect of the disclosure comprises a DC port, an AC port, and a central resonant circuit. The central resonant circuit may be a series-resonant circuit. The power converter comprises a set of controllable "DC" switches coupled to the DC port and to the central resonant circuit, and a filter coupled to the AC port, which filter generates a voltage during operation of the converter. The power converter also comprises a set of "AC" switches coupled to the central resonant circuit (26) and to the filter. An internal command generator calculates the currents required at the AC port to satisfy at least the desired converter power and DC voltage, and generates internal current commands representing the currents at the AC port. A switch control circuit is coupled to the DC and AC switches, for selecting the active switches in response to sensor feedback and the internal current commands, and for calculating switch ON and OFF times using "inversion" and "secondary-to-tertiary" time commands. A modulator is responsive to the internal current commands, and calculates the required percentage of "inversion" and "secondary-to-tertiary" time percentages to satisfy the current commands from the internal command generator block.

A method according to an aspect of the disclosure is for controlling a power converter, which power converter includes a direct voltage port and a three-phase AC port, and which also includes a low-pass filter. The low-pass filter includes a low-pass filter first port and a low-pass filter second port. The low-pass filter second port is coupled to the three-phase port of the converter. The power converter includes a resonant central link, and first and second controllable switch sets. The first switch set connects the direct voltage port to the central link, and the second controllable switch set connects the central link to the low-pass filter first port. The power converter also includes alternating voltage and current sensors coupled to the alternating port, for generating samples of the alternating voltage and current, respectively. The first operating mode provides power transfer from the direct voltage port to the alternating port with controlled real and reactive power, the second operating mode provides power transfer from the direct voltage port to the three-phase port with constant peak three-phase voltage, and the third operating mode provides power transfer from the three-phase port to the direct voltage port. The method comprises the steps of (a) generating inversion and secondary-to-tertiary time percentages in response to the filter voltage and to the current at the AC port, and (b) generating ON-OFF control signals for the first and second controllable switch sets in response to inversion and secondary-to-tertiary time percentages.

While exemplary drawings and specific embodiments of the present disclosure have been described and illustrated, it is to be understood that the scope of the invention as set forth in the claims is not to be limited to the particular embodiments discussed. Thus, the embodiments shall be regarded as illustrative rather than restrictive, and it should be understood that variations may be made in those embodiments by persons skilled in the art without departing from the scope of the invention as set forth in the claims that follow and their structural and functional equivalents.

What is claimed is:

1. A power converter, comprising:
   a DC port;
   a three-phase AC port; a central resonant circuit having a resonant period;
   a set of controllable "DC" switches for electrically interconnecting said DC port and said central resonant circuit;
   a filter electrically connected to said AC port, said filter generating a voltage during operation of said converter;
   a set of controllable "AC" switches for electrically interconnecting the central resonant circuit and said filter;
   a switch control circuit responsive to a phase order, to a secondary-to-tertiary time percentage, and to an inversion time percentage for controlling inversion and normal conduction times of said DC and AC switches; and
   a modulator responsive to said voltage at said DC port, to said voltage of said filter, to current command signals, and to the voltage at the AC port, for generating the phase order, the inversion time percentage and the secondary-to-tertiary time percentage;
   wherein said phase order designates a first phase of the three-phase AC port as primary, and designates a second phase of the three-phase AC port as secondary, and designates a third phase of the three-phase AC port as tertiary;
   wherein said inversion time percentage is a percentage of the resonant period of the central resonant circuit, said inversion time percentage being used to determine a time of an end of an inversion state of a set of controllable switches, and said secondary-to-tertiary time percentage is used to determine a time of occurrence of a pulse transition from the secondary phase to the tertiary phase;

wherein said inversion time percentage is generated by said modulator based on said voltage at said DC port, on said voltage of said filter, on said current command signals, and on said voltage at the AC port; and wherein said inversion time percentage is further used to determine a time when a polarity of the DC switches is flipped.

2. A converter according to claim 1, wherein said resonant circuit is a series-resonant circuit.

3. A converter, comprising:
a DC port;
a three-phase AC port;
a central resonant circuit having a resonant period;
a set of controllable "DC" switches for electrically interconnecting said DC port and said central resonant circuit;
a filter electrically connected to said AC port,
said filter generating a voltage during operation of said converter;
a set of controllable "AC" switches for electrically interconnecting the central resonant circuit and said filter;
a switch control circuit responsive to a phase order, to a secondary-to-tertiary time percentage, and to an inversion time percentage for controlling inversion and normal conduction times of said DC and AC switches; and
a modulator responsive to said voltage at said DC port, to said voltage of said filter, to current command signals, and to the voltage at the AC port, for generating the phase order, the inversion time percentage and the secondary-to-tertiary time percentage wherein said phase order designates a first phase of the three-phase AC port as primary, and designates a second phase of the three-phase AC port as secondary, and designates a third phase of the three-phase AC port as tertiary;

wherein said inversion time percentage is a percentage of the resonant period of the central resonant circuit, said inversion time percentage being used to determine a time of an end of an inversion state of a set of controllable switches, and said secondary-to-tertiary time percentage is used to determine a time of occurrence of a pulse transition from the secondary phase to the tertiary phase;

wherein said inversion time percentage is generated by said modulator based on said voltage at said DC port, on said voltage of said filter, on said current command signals, and on said the voltage at the AC port and wherein said inversion time percentage is further used to determine a time when a polarity of the DC switches is flipped wherein said modulator comprises:

a primary-secondary-tertiary selector electrically connected to said filter for determining the phase order;
a norm calculator for calculating the norm of current command signals in response to said current command signals;
a subtractor for subtracting said norm of the current command signal from signal representing a maximum possible value of said current command signals, to generate said inversion time percentage;

a secondary-to-primary current ratio calculator for generating ideal secondary-to-primary ratio in response to said current command signals and said phase order;
a secondary-to-primary current ratio calculator for generating actual secondary-to-primary ratio in response to said phase order and a sample of said current at the AC port;
a proportional-integral processor for generating secondary-to-tertiary percentage adjustment signal in response to said ideal and actual secondary-to-primary ratios;
a summing processor for summing said secondary-to-primary percentage adjustment signal with said ideal secondary-to-primary ratio in response to said ideal secondary-to-primary ratio and said secondary-to-tertiary percentage adjustment signals, to produce said secondary-to-primary time percentage.

4. A converter according to claim 1, wherein said switch control circuit comprises:
a receiver for receiving said secondary-to-tertiary transition time and said inversion percentage command, and for calculating the switching times therefrom;
a current direction determining arrangement for finding the central link current direction;
a current polarity determining arrangement for determining the input and output current polarities;
an active switch finder for finding the active switches; and
a signal generator for generating the ON and OFF switch control signals for the active switches.

5. A controller for a power converter, said controller comprising:
a switch element controller for generating on-off control signals for first and second controllable switch sets of said power converter in response to an inversion time percentage and a secondary-to-tertiary time percentage; and
a modulator responsive to a filter voltage of a filter of said power converter and to a current at an AC port of the power converter, for generating the inversion time percentage and the secondary-to-tertiary time percentage;
wherein said inversion time percentage is a percentage of a resonant period of a central resonant circuit, said inversion time percentage being is used to determine a time of an end of an inversion state of a controllable switch set, and said secondary-to-tertiary time percentage is used to determine a time of occurrence of a pulse transition from the secondary phase to the tertiary phase;
wherein said inversion time percentage is generated by said modulator based on said filter voltage and on said current; and
wherein said inversion time percentage is also used to determine a time when a polarity of a set of controllable switches is flipped.

6. A controller according to claim 5, wherein said resonant central link is a series-resonant circuit.

7. A power converter comprising:
a DC port;
a three-phase AC port;
a central resonant circuit having a resonant period;
a set of controllable "DC" switches for electrically interconnecting said DC port and said central resonant circuit;
a filter electrically connected to said AC port, said filter generating a voltage during operation of said converter;
a set of controllable "AC" switches for electrically interconnecting the central resonant circuit and said filter;
an internal command generator for calculating the currents at the AC port to satisfy at least the desired converter power and DC voltage, and for generating internal current commands representing said currents at the AC port;

a switch control circuit electrically interconnected with said DC and AC switches, for selecting active switches in response to sensor feedback and said internal current commands, and for calculating switch ON and OFF times based on an inversion time command and a secondary-to-tertiary time command; and a modulator responsive to said internal current commands, for calculating a required inversion time percentage and a secondary-to-tertiary time percentage to satisfy the current commands from the internal command generator;

wherein said inversion time percentage is a percentage of the resonant period of the central resonant circuit, said inversion time percentage being used to determine a time of an end of an inversion state of a set of controllable switches, and said secondary-to-tertiary time percentage is used to determine a time of occurrence of a pulse transition from the secondary phase to the tertiary phase;

wherein said inversion time percentage is generated by said modulator based on said internal current commands to satisfy the current commands from the internal command generator; and wherein said inversion time percentage is further used to determine a time when a polarity of the DC switches is flipped.

8. A power converter according to claim 1, wherein said central resonant circuit is a series resonant circuit.

9. A method for controlling a power converter, said method comprising the steps of:

generating an inversion time percentage and a secondary-to-tertiary time percentage in response to a voltage produced by a filter of the power converter and a current at an AC port of the power converter; and generating on-off control signals for first and second controllable switch sets of the power converter in response to the inversion time percentage and to the secondary-to-tertiary time percentage;

wherein said inversion time percentage is a percentage of a resonant period of a resonant circuit and is used to determine a time of an end of an inversion state of a controllable switch set, and said secondary-to-tertiary time percentage is used to determine a time of occurrence of a pulse transition from the secondary phase to the tertiary phase;

wherein said inversion time percentage is generated based on said voltage and on said current; and wherein said inversion time percentage is further used to determine a time when a polarity of a set of controllable switches is flipped.

* * * * *